(12) United States Patent
Aduh et al.

(10) Patent No.: US 11,630,027 B1
(45) Date of Patent: Apr. 18, 2023

(54) TESTING RIGS HAVING VARIABLE MASS PROPERTIES FOR ROBOTIC END EFFECTORS AND ASSOCIATED METHODS OF USE

(71) Applicant: Amazon Technologies, Inc., Seattle, WA (US)

(72) Inventors: Erica Aduh, Cambridge, MA (US); Jude Jonas, Hudson, NH (US); Kristine Bunker-Moore, Cambridge, MA (US); Michel Bruehwiler, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 17/191,371

(22) Filed: Mar. 3, 2021

(51) Int. Cl.
*G01M 13/027* (2019.01)
*G01L 5/16* (2020.01)
*G01L 25/00* (2006.01)

(52) U.S. Cl.
CPC ............. *G01M 13/027* (2013.01); *G01L 5/16* (2013.01); *G01L 25/00* (2013.01)

(58) Field of Classification Search
CPC ......... G01M 13/027; G01L 5/16; G01L 25/00
See application file for complete search history.

(56) References Cited

U.S. PATENT DOCUMENTS 11,331,810 B2 * 5/2022 Naitou ................. B25J 9/1612
11,504,860 B2 * 11/2022 Hayashi ............... B25J 13/085

* cited by examiner

*Primary Examiner* — Freddie Kirkland, III
(74) *Attorney, Agent, or Firm* — Athorus, PLLC

(57) ABSTRACT

Systems and methods to test robotic end effectors may comprise a testing rig having variable mass properties. The testing rig may include a variable weight assembly and a movement assembly that can adjust a position or orientation of the variable weight assembly. In this manner, the testing rig can be modified to simulate or replicate mass properties of a plurality of items, and grasp performance of a robotic end effector may be measured using the testing rig. Further, simulation models of end effectors and items may be validated based on actual grasp performance of a robotic end effector and the testing rig having variable mass properties.

20 Claims, 13 Drawing Sheets

TESTING RIGS HAVING VARIABLE MASS PROPERTIES FOR ROBOTIC END EFFECTORS AND ASSOCIATED METHODS OF USE

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes may utilize robotic arms or other automated movement systems or equipment to grasp, lift, transport, and release items. Accordingly, there is a need for safe, reliable, and efficient systems and methods to facilitate design, testing, validation, and operations of the various material handling systems and processes within a material handling facility, thereby improving the speed, reliability, and efficiency of such processes.

DETAILED DESCRIPTION

Figure 1:
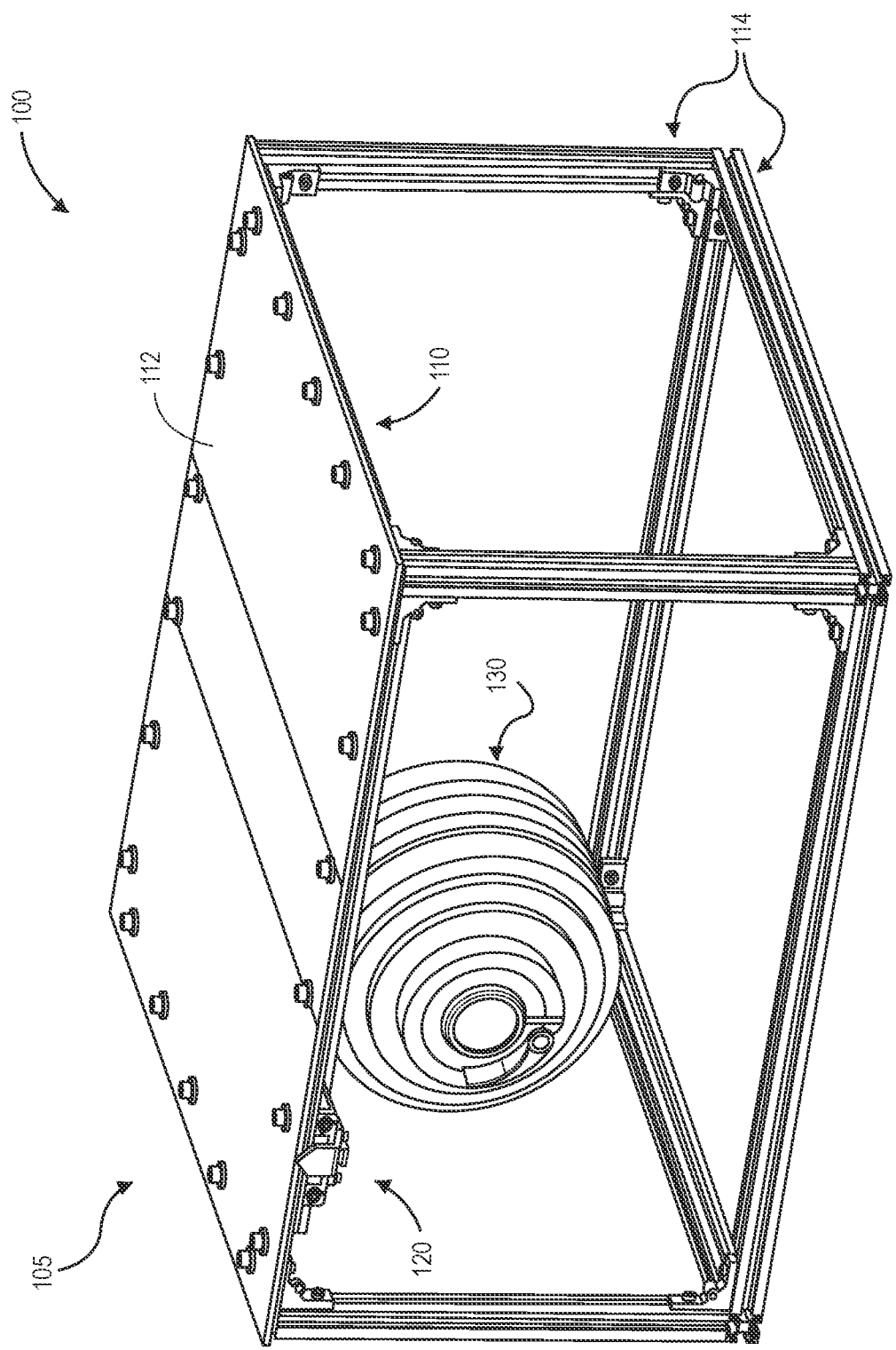
FIG. 1 is a schematic, perspective view diagram of a first example testing rig having variable mass properties, in accordance with implementations of the present disclosure.

As is set forth in greater detail below, implementations of the present disclosure are directed to systems and methods to design, test, validate, and calibrate robotic arms and associated end effectors or end of arm tools (EoATs) using testing rigs having variable mass properties.

In example embodiments, a testing rig having variable mass properties may comprise a base plate, a movement assembly, and a variable weight assembly. A robotic arm or other movement system having an associated end effector or EoAT may grasp the testing rig via the base plate. For example, the end effector may utilize suction to grasp one or more surfaces of the base plate. In addition, material properties associated with the surfaces of the base plate may be modified or adjusted, e.g., made or formed of cardboard, plastic, or other materials.

In addition, the variable weight assembly may be movably coupled to the base plate via the movement assembly. For example, the movement assembly may comprise one or more linear slides, lead screws, guide tracks, rotary joints, actuators, sensors, or combinations thereof. Further, the variable weight assembly may comprise a weight arm, a weight shaft, one or more weights, one or more clamps, or combinations thereof. The variable weight assembly may move to various positions and/or orientations relative to the base plate via the movement assembly. In this manner, mass properties associated with the testing rig may be modified or adjusted, e.g., mass properties such as weights, moments, weight distribution, center of gravity, or others.

Using a testing rig having variable mass properties, grasping, lifting, transport, release, and/or other operations of various robotic arms or other movement systems having associated end effectors may be designed, tested, validated, and calibrated. For example, the testing rig may be modified or adjusted with various mass properties to simulate different types of items or objects that may be grasped by the end effectors. In this manner, robotic arms and end effectors may be safely, reliably, and efficiently designed and tested for various types of items using the testing rig having variable mass properties.

Furthermore, the testing rig having variable mass properties may be used to validate and/or calibrate simulation models of various robotic arms or other movement systems having associated end effectors, as well as simulation models of items or objects to be grasped. For example, an end effector may be used to grasp the testing rig that has been adjusted to have mass properties associated with an item. In addition, simulation models of the end effector and the item may be generated and executed to simulate the grasping operation. Then, based on differences between physical or actual grasp characteristics of the end effector and the testing rig and simulated grasp characteristics of the simulation models of the end effector and the item, the simulation models of the end effector and the item may be modified, adjusted, or tuned to match the physical or actual grasp characteristics of the end effector and the testing rig. In this manner, simulation models may be safely, reliably, and efficiently generated, validated, and/or calibrated based on physical or actual grasp characteristics using the testing rig having variable mass properties.

FIG. 1 is a schematic, perspective view diagram 100 of a first example testing rig having variable mass properties, in accordance with implementations of the present disclosure.

As shown in FIG. 1, a first example testing rig 105 may comprise a base plate 110 or base frame, a base plate cover 112, a frame or legs 114, a movement assembly 120, and a variable weight assembly 130. Additional details of portions of the testing rig 105 are shown and described at least with respect to FIGS. 2-4H.

The base plate 110 may comprise a substantially flat plate or sheet of material that may be rectangular, square, or other regular or irregular shapes. In example embodiments, the base plate 110 may be approximately 22.25" long by approximately 18.25" wide. In other example embodiments, the base plate 110 may instead comprise a base frame that extends along and around an outer periphery of the base plate 110. The base plate 110 may be formed of various materials, such as aluminum, steel, other metals, plastics, composites, other materials, or combinations thereof. In further example embodiments, the base plate 110 may comprise various other shapes, sizes, dimensions, thicknesses, weights, materials, and/or other characteristics.

The base plate cover 112 may also comprise a substantially flat plate or sheet of material that may be rectangular, square, or other regular or irregular shapes that match a shape of the base plate 110. In example embodiments, the base plate cover 112 may also be approximately 22.25" long by approximately 18.25" wide. The base plate cover 112 may be formed of various materials, such as cardboard, paperboard, wood, other natural or fibrous materials, aluminum, steel, other metals, plastics, composites, other materials, or combinations thereof. In addition, the base plate cover 112 may be coupled to the base plate 110 using fasteners, adhesives, welds, or other types of connectors. In further example embodiments, the base plate cover 112 may comprise various other shapes, sizes, dimensions, thicknesses, weights, materials, and/or other characteristics. For example, the material or surface properties of the base plate cover 112 may be modified or adjusted to simulate different types of materials or surfaces that may be grasped by an end effector.

The frame or legs 114 may comprise beams, rods, struts, plates, surfaces, or other components that form a three-dimensional shape for the testing rig 105, e.g., a box, prism, or other shape. In example embodiments, the frame or legs 114 and base plate 110 may form a rectangular prism approximately 22.25" long by approximately 18.25" wide by approximately 12.25" tall. In other example embodiments, the frame or legs 114 may have various other sizes and/or shapes to approximate the sizes or shapes of boxes, containers, items, or other objects that may be grasped by an end effector. The frame or legs 114 may be formed of various materials, such as aluminum, steel, other metals, plastics, composites, other materials, or combinations thereof. In addition, the frame or legs 114 may be coupled to the base plate 110 using fasteners, adhesives, welds, or other types of connectors. In further example embodiments, the frame or legs 114 may comprise various other shapes, sizes, dimensions, thicknesses, weights, materials, and/or other characteristics. For example, the material or surface properties of the frame or legs 114 may also be modified or adjusted to simulate different types of materials or surfaces that may be grasped by an end effector.

The movement assembly 120 may be coupled to the base plate 110 and enable movement of the variable weight assembly 130 relative to the base plate 110. Additional details of the movement assembly 120 and the variable weight assembly 130 of the testing rig 105 are shown and described at least with respect to FIGS. 2-4H.

Figure 2:
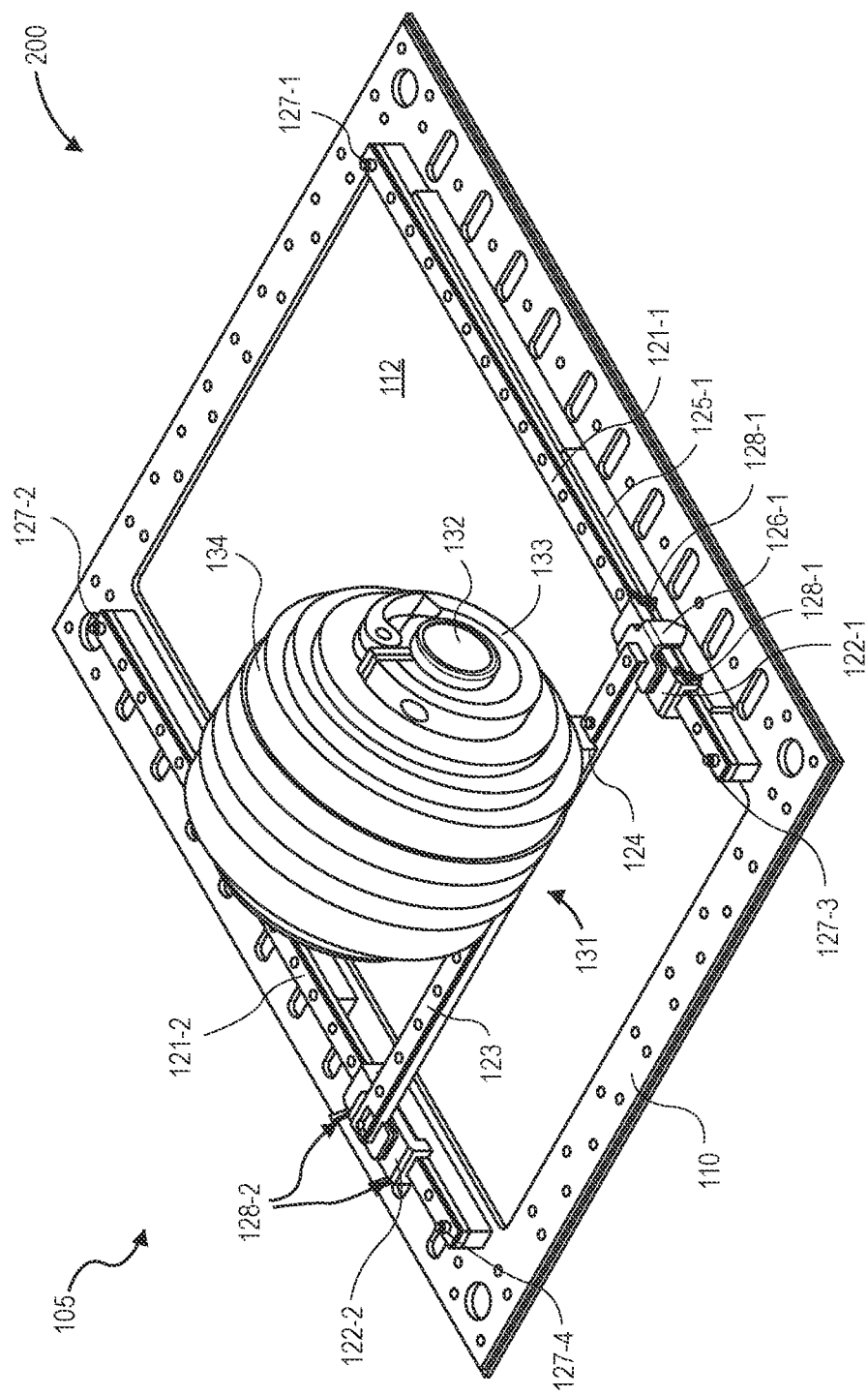
FIG. 2 is another schematic, perspective view diagram of the first example testing rig having variable mass properties, in accordance with implementations of the present disclosure.

FIG. 2 is another schematic, perspective view diagram 200 of the first example testing rig having variable mass properties, in accordance with implementations of the present disclosure. For example, FIG. 2 may be an underside, perspective view of the first example testing rig 105 shown in FIG. 1, in which the frame or legs 114 are not illustrated.

As shown in FIG. 2, the movement assembly 120 of the testing rig 105 may comprise first and second linear slides 121, 122, a third linear slide 123, 124, one or more position guides 125, one or more position indicators 126, one or more stops 127, and one or more brakes or locks 128.

The first and second linear slides 121, 122 may comprise first static portions 121-1, 121-2, e.g., rails or tracks, and second movable portions 122-1, 122-2, e.g., carriages or cars. The first static portions 121 may be coupled to the base plate 110. The second movable portions 122 may be operatively coupled to and move along the first static portions 121. For example, the first and second linear slides 121, 122 may extend substantially parallel with each other along a first direction, e.g., along a length or a width of the base plate 110. The first and second linear slides 121, 122 may be formed of various materials, such as aluminum, steel, other metals, plastics, composites, other materials, or combinations thereof, and may include ball bearings, roller bearings, low friction materials or coatings, or other elements to enable linear or sliding movement of the second movable portions 122 along the first static portions 121. In addition, the first and second linear slides 121, 122 may be coupled to the base plate 110 using fasteners, adhesives, welds, or other types of connectors. In further example embodiments, the first and second linear slides 121, 122 may comprise various other shapes, sizes, dimensions, thicknesses, weights, materials, and/or other characteristics.

The third linear slide 123, 124 may comprise a first static portion 123, e.g., rail or track, and a second movable portion 124, e.g., carriage or car. The first static portion 123 may be coupled to each of the second movable portions 122-1, 122-2, e.g., at ends of the first static portion 123, and move along the first and second linear slides 121, 122 along the first direction. The second movable portion 124 may be operatively coupled to and move along the first static portion 123 along a second direction substantially orthogonal to the first direction. For example, the third linear slide 123, 124 may extend substantially orthogonal to each of the first and second slides 121, 122 along the second direction, e.g., along a width or a length of the base plate 110. The third linear slide 123, 124 may be formed of various materials, such as aluminum, steel, other metals, plastics, composites, other materials, or combinations thereof, and may include ball bearings, roller bearings, low friction materials or coatings, or other elements to enable linear or sliding movement of the second movable portion 124 along the first static portion 123. In addition, the third linear slide 123, 124 may be coupled to the first and second linear slides 121, 122 using fasteners, adhesives, welds, or other types of connectors. In further example embodiments, the third linear slide 123, 124 may comprise various other shapes, sizes, dimensions, thicknesses, weights, materials, and/or other characteristics.

The one or more position guides 125 may comprise rulers, gauges, or other position measurement instruments, and the one or more position indicators 126 may comprise arrows, pointers, or other position indication elements. For example, a first position guide 125-1 may be coupled to the first static portion 121-1 of the first linear slide, and a first position indicator 126-1 may be coupled to and move with the second movable portion 122-1 of the first linear slide. In additional example embodiments, one or more of the second linear slide 121-2, 122-2 and the third linear slide 123, 124 may also include respective position guides 125 and position indicators 126 coupled therewith. The position guides 125 and position indicators 126 may be formed of various materials, such as aluminum, steel, other metals, plastics, composites, other materials, or combinations thereof In addition, the position guides 125 and position indicators 126 may be coupled to respective ones of the first, second, and third linear slides using fasteners, adhesives, welds, or other types of connectors. In further example embodiments, the position guides 125 and position indicators 126 may comprise various other shapes, sizes, dimensions, thicknesses, weights, materials, and/or other characteristics.

The one or more stops 127 may comprise pegs, blocks, endcaps, bumpers, or other movement limiting elements. For example, first and third stops 127-1, 127-3 may be coupled to opposite ends of the first static portion 121-1 of the first linear slide, and second and fourth stops 127-2, 127-4 may be coupled to opposite ends of the first static portion 121-2 of the second linear slide. In additional example embodiments, the first static portion 123 of the third linear slide may also include respective stops 127 coupled at opposite ends thereof. The stops 127 may be formed of various materials, such as aluminum, steel, other metals, plastics, composites, rubber, silicone, elastomers, other materials, or combinations thereof. In addition, the stops 127 may be coupled to respective ones of the first, second, and third linear slides using fasteners, adhesives, welds, or other types of connectors. In further example embodiments, the stops 127 may comprise various other shapes, sizes, dimensions, thicknesses, weights, materials, and/or other characteristics.

The one or more brakes or locks 128 may comprise wingnuts, screws, bolts, wedges, pegs, blocks, or other movement limiting elements. For example, one or more brakes 128-1 may be operatively coupled to the second movable portion 122-1 of the first linear slide, and one or more brakes 128-2 may be operatively coupled to the second movable portion 122-2 of the second linear slide. The one or more brakes 128 may contact, insert into, or engage with parts of the first static portions 121 of the first and second linear slides in order to stop, brake, or otherwise limit movement of the second movable portions 122 relative to the first static portions 121. In additional example embodiments, the second movable portion 124 of the third linear slide may also include respective brakes 128 operatively coupled thereto to limit movement of the second movable portion 124 relative to the first static portion 123 of the third linear slide. The brakes 128 may be formed of various materials, such as aluminum, steel, other metals, plastics, composites, rubber, silicone, elastomers, other materials, or combinations thereof In addition, the brakes 128 may be coupled to respective ones of the first, second, and third linear slides using fasteners, adhesives, welds, or other types of connectors. In further example embodiments, the brakes 128 may comprise various other shapes, sizes, dimensions, thicknesses, weights, materials, and/or other characteristics.

Figure 3A:
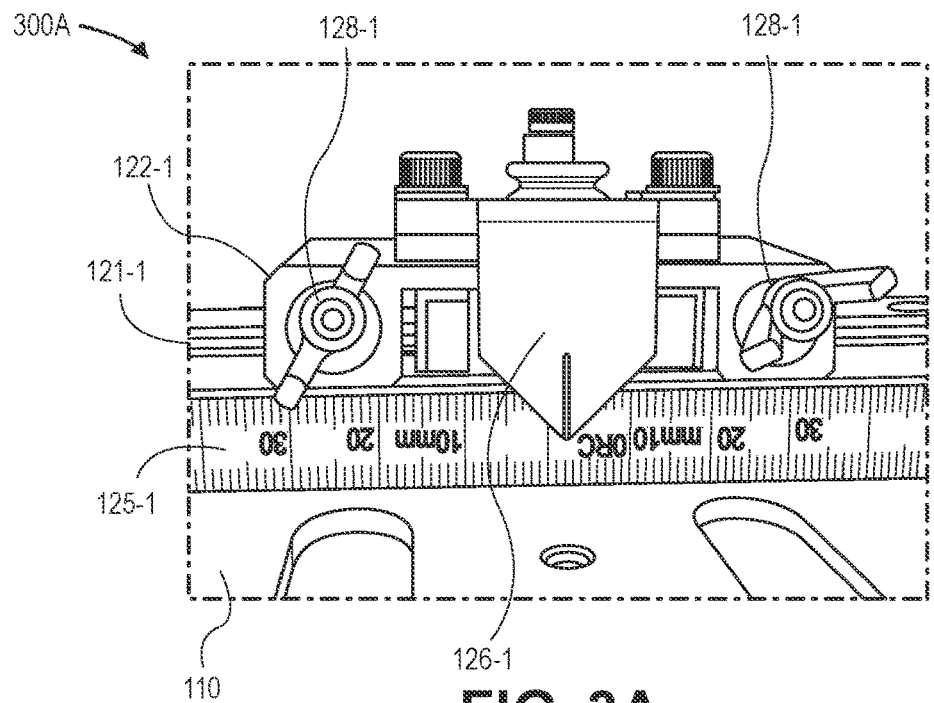
FIG. 3A is schematic diagram of a movement assembly of the first example testing rig having variable mass properties, in accordance with implementations of the present disclosure.

FIG. 3A is schematic diagram 300A of a movement assembly of the first example testing rig having variable mass properties, in accordance with implementations of the present disclosure. For example, FIG. 3A may be a close-up, side perspective view of a portion of the movement assembly of the first example testing rig 105 shown in FIGS. 1 and 2.

As shown in FIG. 3A, the first linear slide may comprise a first static portion 121-1 and a second movable portion 122-1 that is operatively coupled to and moves along the first static portion 121-1. A first position guide 125-1, e.g., a metric ruler, may be coupled to a part of the first static portion 121-1. In addition, a first position indicator 126-1, e.g., an arrow or pointer, may be coupled to and move with the second movable portion 122-1. Further, one or more brakes 128-1 may be operatively coupled to the second movable portion 122-1, and the brakes 128-1 may be configured to limit movement of the second movable portion 122-1 relative to the first static portion 121-1, e.g., by rotating or turning the wingnuts to contact, engage with, or otherwise cause interference between the second movable portion 122-1 and the first static portion 121-1. Each of the second and third linear slides may also include any and all of the features described herein with respect to the first linear slide.

In addition, as shown in FIG. 2, the variable weight assembly 130 of the testing rig 105 may comprise a weight arm 131, a weight shaft 132, one or more clamps 133, and one or more weights 134.

The weight arm 131 may comprise an arm, beam, rod, strut, or other component configured to couple variable weights to the second movable portion 124 of the third linear slide. For example, the weight arm 131 may be coupled to the second movable portion 124 and may extend away from the base plate 110. The weight arm 131 may have various lengths to adjust or modify a distance or position of the variable weights relative to the base plate 110. In additional example embodiments, one or more spacers may be positioned or coupled between the weight arm 131 and the second movable portion 124 in order to further adjust or modify a distance or position of the variable weights relative to the base plate 110. Further, the weight arm 131 may include a hole, orifice, clamp, or other receptacle configured to receive and hold a weight shaft 132, as described herein. The weight arm 131 may be formed of various materials, such as aluminum, steel, other metals, plastics, composites, other materials, or combinations thereof. In addition, the weight arm 131 may be coupled to the third linear slide using fasteners, adhesives, welds, or other types of connectors. In further example embodiments, the weight arm 131 may comprise various other shapes, sizes, dimensions, thicknesses, weights, materials, and/or other characteristics.

The weight shaft 132 may comprise an arm, beam, rod, strut, or other component configured to couple variable weights to the second movable portion 124 of the third linear slide via the weight arm 131. For example, the weight shaft 132 may be coupled to the hole, orifice, clamp, or other receptacle of the weight arm 131 and may extend in various directions relative to the weight arm 131. The weight shaft 132 may have various diameters, shapes, or lengths to receive variable weights. The weight shaft 132 may be formed of various materials, such as aluminum, steel, other metals, plastics, composites, other materials, or combinations thereof. In addition, the weight shaft 132 may be coupled to the weight arm 131 using fasteners, adhesives, welds, or other types of connectors. In further example embodiments, the weight shaft 132 may comprise various other shapes, sizes, dimensions, thicknesses, weights, materials, and/or other characteristics.

The one or more clamps 133 may comprise collars, couplings, screw clamps, or other types of clamps configured to hold or retain variable weights attached to the weight shaft 132. For example, the clamps 133 may contact, engage with, or fasten tightly onto or around the weight shaft 132, thereby holding or retaining variable weights attached to the weight shaft 132. The clamps 133 may have various diameters, sizes, or shapes. The clamps 133 may be formed of various materials, such as aluminum, steel, other metals, plastics, composites, other materials, or combinations thereof. In addition, the clamps 133 may be coupled to the weight shaft 132 using fasteners, adhesives, welds, or other types of connectors. In further example embodiments, the clamps 133 may comprise various other shapes, sizes, dimensions, thicknesses, weights, materials, and/or other characteristics.

The one or more weights 134 may comprise rings, discs, plates, free weights, or other types of weights that may be coupled to the weight shaft 132. For example, the weights 134 may be added, slid, attached, or coupled to the weight shaft 132, and the clamps 133 may then contact, engage with, or fasten tightly onto or around the weight shaft 132, thereby holding or retaining the weights 134 on the weight shaft 132. The weights 134 may have various diameters, sizes, or shapes. In example embodiments, the weights 134 may be sized to incrementally add or subtract weight onto the weight shaft 132, e.g., in increments of 0.5 kg, 1.0 kg, 1 lb, 2 lbs, 5 lbs, or other increments. The weights 134 may be formed of various materials, such as aluminum, steel, other metals, plastics, composites, rubber, silicone, elastomers, other materials, or combinations thereof. In addition, the weights 134 may be coupled to the weight shaft 132 using fasteners, adhesives, welds, or other types of connectors. In further example embodiments, the weights 134 may comprise various other shapes, sizes, dimensions, thicknesses, weights, materials, and/or other characteristics.

Figure 3B:
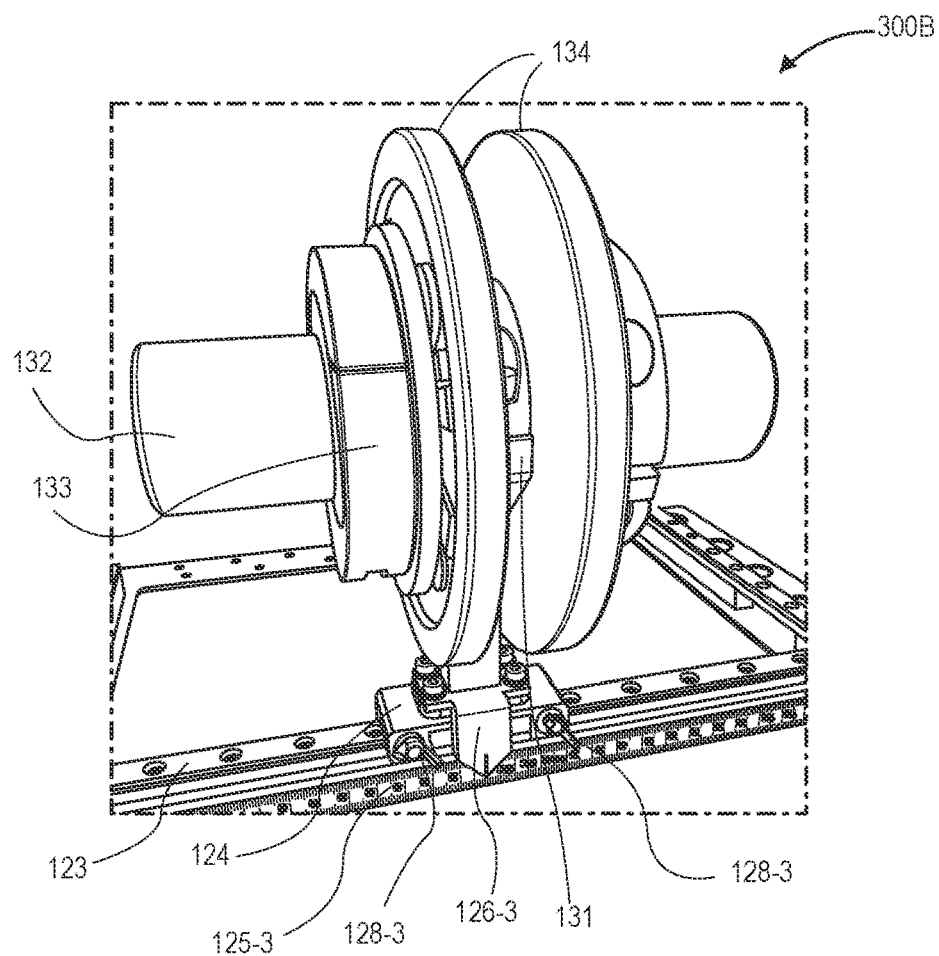
FIG. 3B is schematic diagram of a weight assembly of the first example testing rig having variable mass properties, in accordance with implementations of the present disclosure.

FIG. 3B is schematic diagram 300B of a weight assembly of the first example testing rig having variable mass properties, in accordance with implementations of the present disclosure. For example, FIG. 3B may be a close-up, side perspective view of the weight assembly of the first example testing rig 105 shown in FIGS. 1 and 2.

As shown in FIG. 3B, the third linear slide may comprise a first static portion 123 and a second movable portion 124 that is operatively coupled to and moves along the first static portion 123. A third position guide 125-3, e.g., a metric ruler, may be coupled to a part of the first static portion 123. In addition, a third position indicator 126-3, e.g., an arrow or pointer, may be coupled to and move with the second movable portion 124. Further, one or more brakes 128-3 may be operatively coupled to the second movable portion 124, and the brakes 128-3 may be configured to limit movement of the second movable portion 124 relative to the first static portion 123, e.g., by rotating or turning the wingnuts to contact, engage with, or otherwise cause interference between the second movable portion 124 and the first static portion 123.

In addition, a weight arm 131 may be coupled to the second movable portion 124 of the third linear slide and extend substantially in a direction away from the base plate 110. The weight arm 131 may receive and couple to a weight shaft 132, and the weight shaft 132 may receive one or more weights 134 that are held or retained on the weight shaft 132 by one or more clamps 133 coupled thereto.

In this manner, the movement assembly 120 described herein may provide variable position and/or orientation of the weight assembly 130 relative to the base plate 110, in order to vary mass properties associated with a testing rig 105. In addition, the weight assembly 130 may receive and couple variable weights or loads to the testing rig 105 via the movement assembly 120, in order to further vary mass properties associated with the testing rig 105. Moreover, the base plate 110 and/or base plate cover 112 may be formed with various types of materials to vary surface properties associated with the testing rig 105.

FIGS. 4A-4H are schematic, perspective view diagrams 400A-400H of the first example testing rig having variable mass properties, in accordance with implementations of the present disclosure. The testing rig shown and described in FIGS. 4A-4H may include any and all of the features of the testing rig as shown and described at least with respect to FIGS. 1-3B.

In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 2 5kg.

Figure 4B:
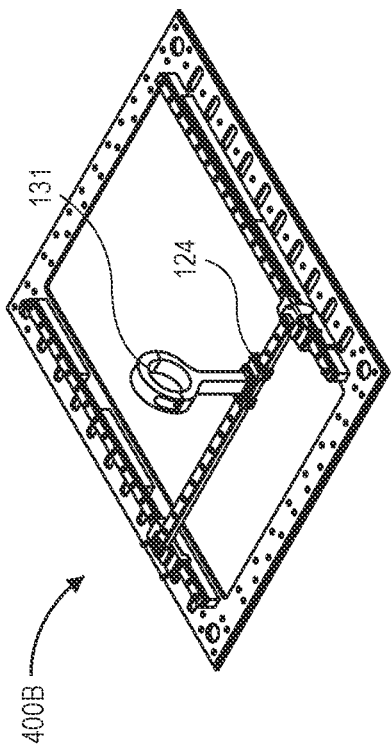
FIGS. 4A-4H are schematic, perspective view diagrams of the first example testing rig having variable mass properties, in accordance with implementations of the present disclosure.
Figure 4D:
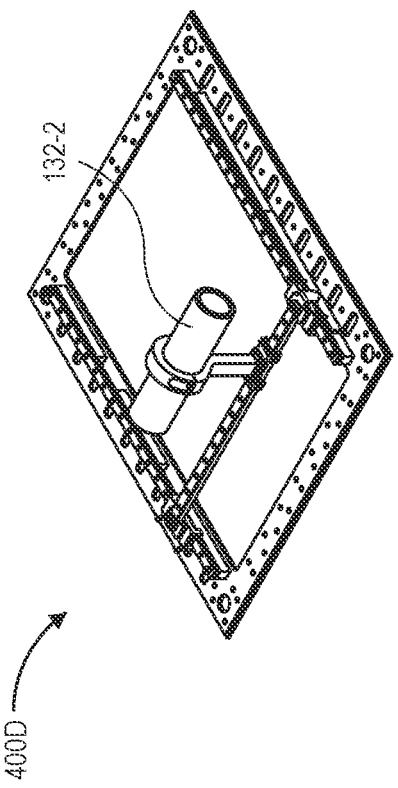
Figure 4A:
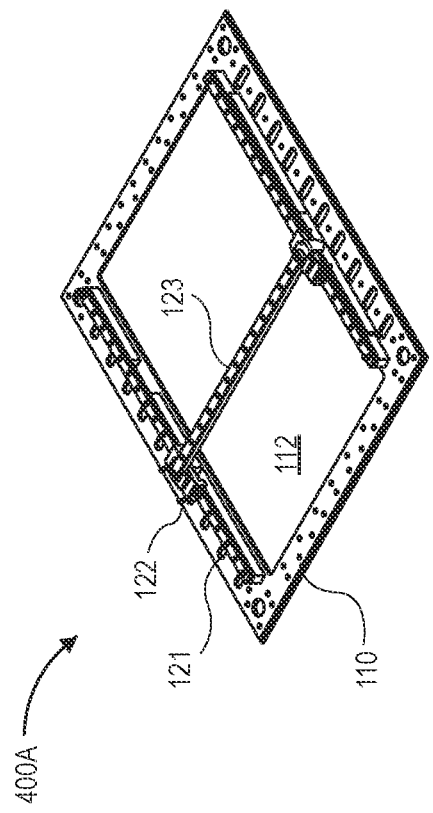

As shown in the schematic diagram 400A of FIG. 4A, an example testing rig may comprise a base plate 110, a base plate cover 112, first and second linear slides 121, 122, and a first static portion 123 of a third linear slide. In this example embodiment, the total weight of the testing rig may be approximately 2.5 kg.

As shown in the schematic diagram 400B of FIG. 4B, an example testing rig may comprise all the components shown in FIG. 4A, and may further comprise a second movable portion 124 of the third linear slide and a weight arm 131. In this example embodiment, the total weight of the testing rig may be approximately 3.0 kg.

Figure 4C:
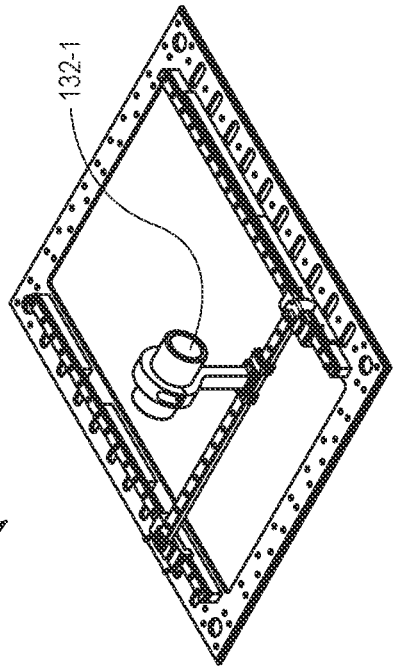

As shown in the schematic diagram 400C of FIG. 4C, an example testing rig may comprise all the components shown in FIGS. 4A-4B, and may further comprise a first example weight shaft 132-1. In this example embodiment, the total weight of the testing rig may be approximately 3.5 kg.

As shown in the schematic diagram 400D of FIG. 4D, an example testing rig may comprise all the components shown in FIGS. 4A-4C, and may further comprise a second example weight shaft 132-2 instead of the first example weight shaft 132-1, with the second example weight shaft 132-2 being larger, longer, and/or heavier than the first example weight shaft 132-1. In this example embodiment, the total weight of the testing rig may be approximately 4.0 kg.

Figure 4E:
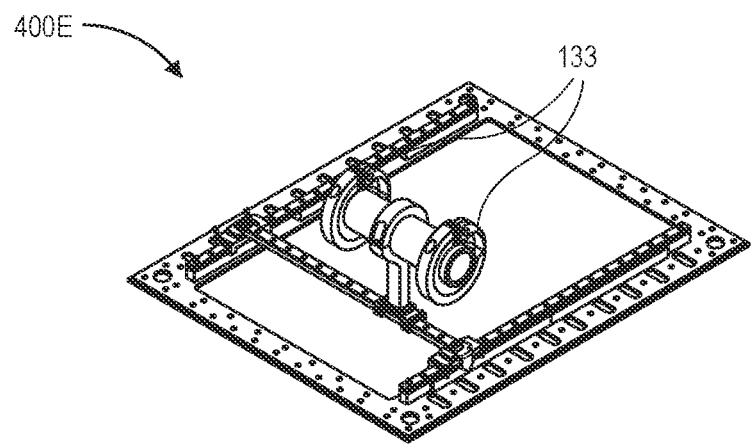

As shown in the schematic diagram 400E of FIG. 4E, an example testing rig may comprise all the components shown in FIGS. 4A-4D, and may further comprise one or more clamps 133. In this example embodiment, the total weight of the testing rig may be approximately 4.5 kg.

Figure 4F:
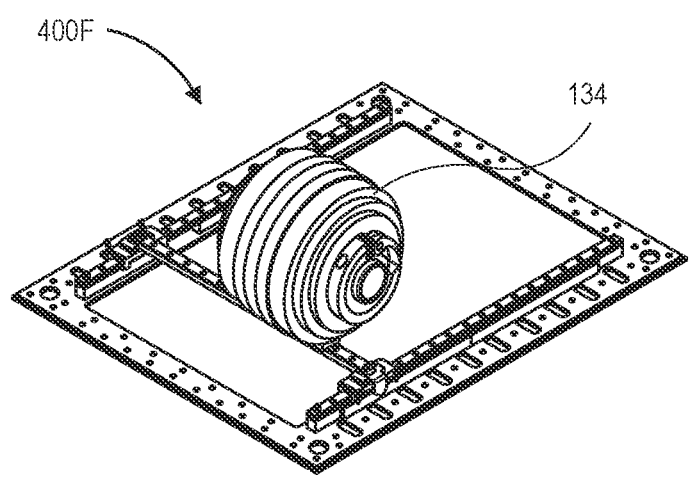

As shown in the schematic diagram 400F of FIG. 4F, an example testing rig may comprise all the components shown in FIGS. 4A-4E, and may further comprise one or more weights 134. In this example embodiment, the total weight of the testing rig may vary between approximately 5.0 kg and approximately 25.0 kg based on the number, size, type, and/or material of the weights 134 coupled to the weight shaft 132-2. For example, the weights 134 may be sized to incrementally add or subtract weight to the testing rig, e.g., in increments of 0.5 kg, 1.0 kg, or other increments.

Figure 4H:
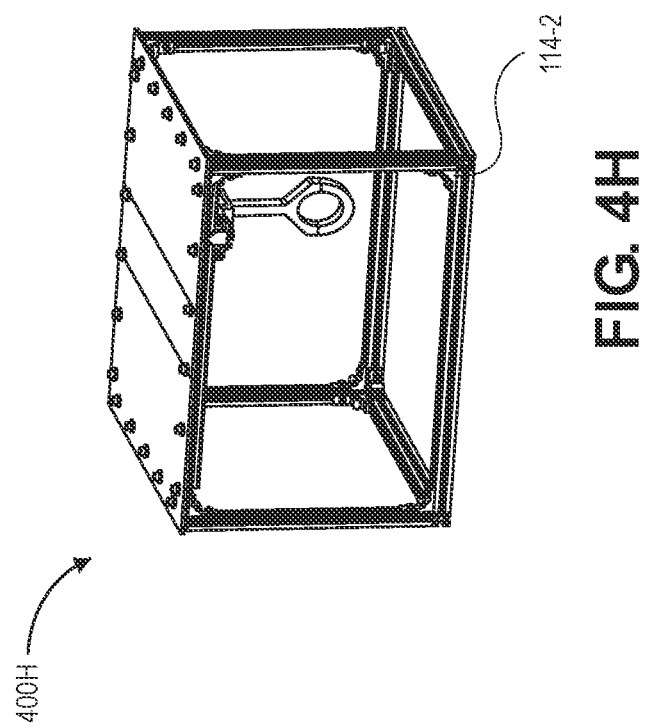
Figure 4G:
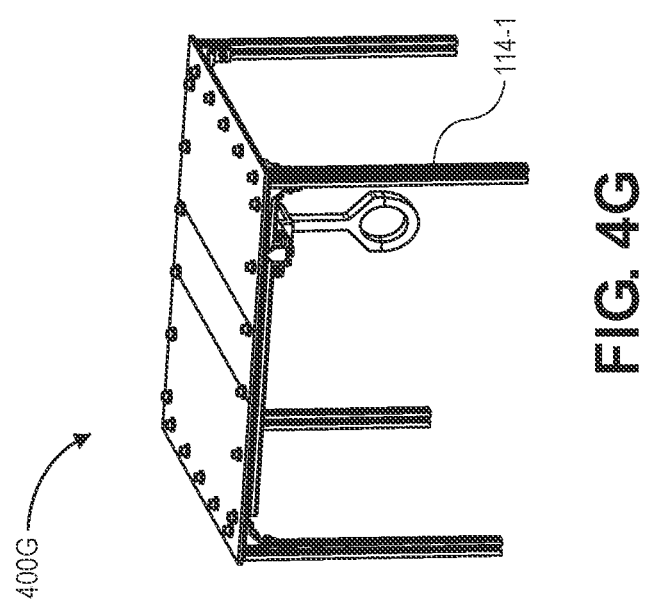

As shown in the schematic diagram 400G of FIG. 4G, an example testing rig may comprise all the components shown in FIGS. 4A-4B, and may further comprise one or more legs 114-1. In this example embodiment, the total weight of the testing rig may be approximately 3.7 kg.

As shown in the schematic diagram 400H of FIG. 4H, an example testing rig may comprise all the components shown in FIGS. 4A-4B, and may further comprise a box-shaped frame 114-2. In this example embodiment, the total weight of the testing rig may be approximately 5.2 kg.

Various other combinations of the components described herein may be included in an example testing rig in order to modify or adjust mass properties of the testing rig as desired.

In additional example embodiments, the example testing rig 105 may comprise a controller or control system that is configured to control one or more components of the testing rig 105. The controller may be in communication with other control systems, e.g., a robotic arm or movement system controller, a material handling facility control system, a warehouse management system, or other control systems, via wired or wireless communication networks.

In further example embodiments, the example testing rig 105 may also include one or more actuators. For example, the actuators may be associated with one or more of the first, second, and third linear slides to cause movement of the second movable portions relative to the first static portions of the linear slides. In addition, the actuators may be associated with one or more of the brakes or locks to stop or limit movement of the second movable portions relative to the first static portions of the linear slides. Various types of actuators may be included, e.g., linear actuators, rotary actuators, servos, solenoids, or other types of actuators.

In further example embodiments, the example testing rig 105 may also include one or more sensors. For example, the sensors may be associated with one or more of the first, second, and third linear slides to detect or measure position, speed, or acceleration of the second movable portions relative to the first static portions of the linear slides. In addition, the sensors may be associated with one or more actuators that may cause or limit movement of the second movable portions relative to the first static portions of the linear slides. Further, the sensors may be associated with portions of the weight assembly, linear slides, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 5:
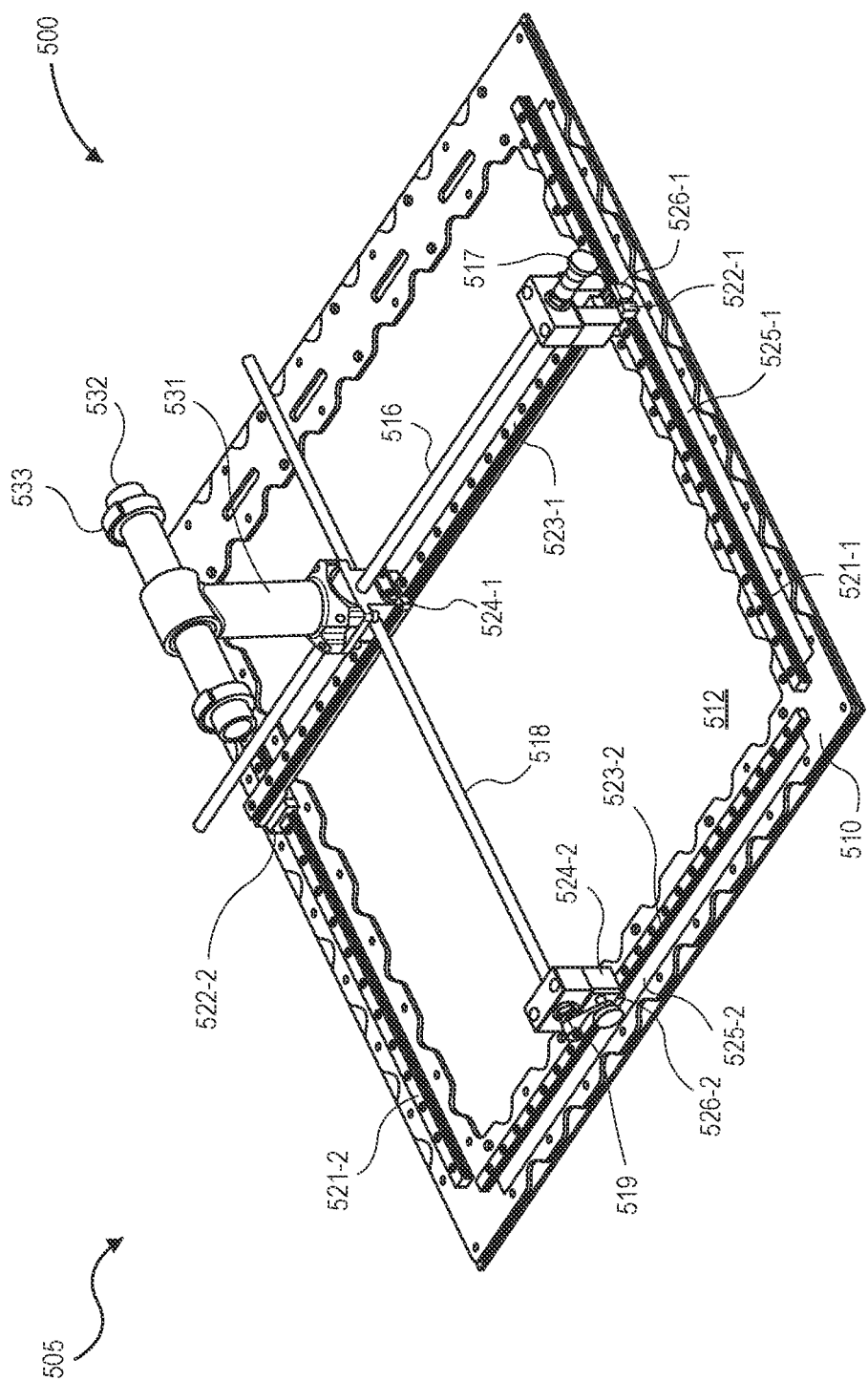
FIG. 5 is a schematic, perspective view diagram of a second example testing rig having variable mass properties, in accordance with implementations of the present disclosure.

FIG. 5 is a schematic, perspective view diagram 500 of a second example testing rig having variable mass properties, in accordance with implementations of the present disclosure. The testing rig shown and described in FIGS. 5-6B may include any and all of the features of the testing rig as shown and described at least with respect to FIGS. 1-4H.

As shown in FIG. 5, a movement assembly of the testing rig 505 may comprise first and second linear slides 521, 522, third and fourth linear slides 523, 524, one or more position guides 525, one or more position indicators 526, a first lead screw 516, a first crank 517, a second lead screw 518, a second crank 519, one or more stops (not shown), and one or more brakes or locks 528.

The first and second linear slides 521, 522 may comprise first static portions 521-1, 521-2, e.g., rails or tracks, and second movable portions 522-1, 522-2, e.g., carriages or cars. The first static portions 521 may be coupled to the base plate 510. The second movable portions 522 may be operatively coupled to and move along the first static portions 521. For example, the first and second linear slides 521, 522 may extend substantially parallel with each other along a first direction, e.g., along a length or a width of the base plate 510 and base plate cover 512. The first and second linear slides 521, 522 may be formed of various materials, such as aluminum, steel, other metals, plastics, composites, other materials, or combinations thereof, and may include ball bearings, roller bearings, low friction materials or coatings, or other elements to enable linear or sliding movement of the second movable portions 522 along the first static portions 521. In addition, the first and second linear slides 521, 522 may be coupled to the base plate 510 using fasteners, adhesives, welds, or other types of connectors. In further example embodiments, the first and second linear slides 521, 522 may comprise various other shapes, sizes, dimensions, thicknesses, weights, materials, and/or other characteristics.

The third and fourth linear slides 523, 524 may comprise first static portions 523-1, 523-2, e.g., rails or tracks, and second movable portions 524-1, 524-2, e.g., carriages or cars. The first static portion 523-1 of the third linear slide may be coupled to each of the second movable portions 522-1, 522-2, e.g., at ends of the first static portion 523-1, and move along the first and second linear slides 521, 522 along the first direction. The first static portion 523-2 of the fourth linear slide may be coupled to the base plate 510. The second movable portions 524-1, 524-2 may be operatively coupled to and move along the first static portions 523-1, 523-2 along a second direction substantially orthogonal to the first direction. For example, the third and fourth linear slides 523, 524 may extend along the second direction substantially orthogonal to each of the first and second slides 521, 522, e.g., along a width or a length of the base plate 510 or base plate cover 512. The third and fourth linear slides 523, 524 may be formed of various materials, such as aluminum, steel, other metals, plastics, composites, other materials, or combinations thereof, and may include ball bearings, roller bearings, low friction materials or coatings, or other elements to enable linear or sliding movement of the second movable portions 524 along the first static portions 523. In addition, the third linear slide may be coupled to the first and second linear slides 521, 522 using fasteners, adhesives, welds, or other types of connectors, and the fourth linear slide may be coupled to the base plate 510 using fasteners, adhesives, welds, or other types of connectors. In further example embodiments, the third and fourth linear slides 523, 524 may comprise various other shapes, sizes, dimensions, thicknesses, weights, materials, and/or other characteristics.

The one or more position guides 525 may comprise rulers, gauges, or other position measurement instruments, and the one or more position indicators 526 may comprise arrows, pointers, or other position indication elements. For example, a first position guide 525-1 may be coupled to the first static portion 521-1 of the first linear slide, and a first position indicator 526-1 may be coupled to and move with the second movable portion 522-1 of the first linear slide. In addition, a second position guide 525-2 may be coupled to the first static portion 523-2 of the fourth linear slide, and a second position indicator 526-2 may be coupled to and move with the second movable portion 524-2 of the fourth linear slide. In additional example embodiments, one or more of the second and third linear slides may also include respective position guides 525 and position indicators 526 coupled therewith. The position guides 525 and position indicators 526 may be formed of various materials, such as aluminum, steel, other metals, plastics, composites, other materials, or combinations thereof. In addition, the position guides 525 and position indicators 526 may be coupled to respective ones of the first, second, third, and fourth linear slides using fasteners, adhesives, welds, or other types of connectors. In further example embodiments, the position guides 525 and position indicators 526 may comprise various other shapes, sizes, dimensions, thicknesses, weights, materials, and/or other characteristics.

Figure 6B:
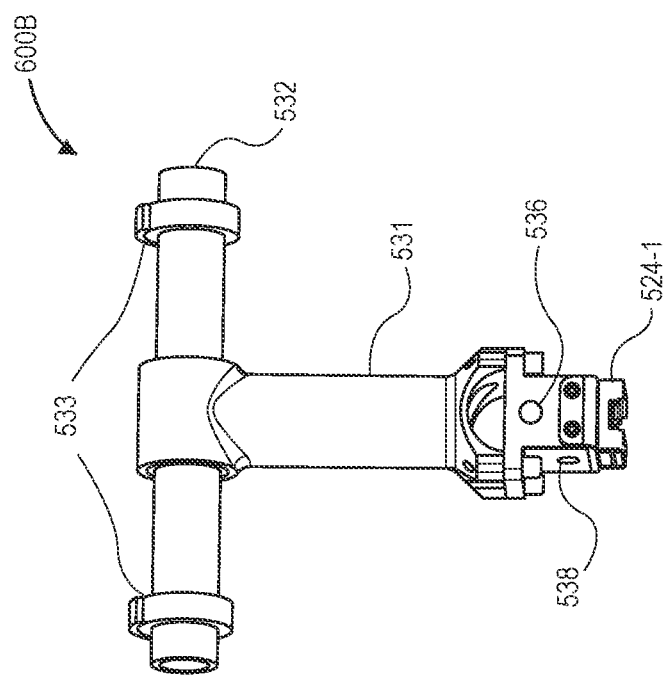
FIG. 6B is schematic diagram of a weight assembly of the second example testing rig having variable mass properties, in accordance with implementations of the present disclosure.

The first lead screw 516 may comprise a threaded rod, machined screw, or other similar component that extends parallel to and along the first static portion 523-1 of the third linear slide, e.g., parallel to the second direction and orthogonal to the first direction. The first lead screw 516 may be in threaded engagement with a first threaded hole 536 of the second movable portion 524-1, as shown in FIG. 6B. By this threaded engagement, rotation of the first lead screw 516 around an axis extending through a center and along a length of the first lead screw 516 may cause corresponding movement of the second movable portion 524-1 along the first static portion 523-1. At one end of the first lead screw 516, e.g., at a second movable portion 522-1 of the first linear slide, a first crank 517 may be operatively coupled to rotate the first lead screw 516. The first lead screw 516 and first crank 517 may be formed of various materials, such as aluminum, steel, other metals, plastics, composites, other materials, or combinations thereof. In addition, the first lead screw 516 and first crank 517 may be coupled to the second movable portion 522-1 of the first linear slide via a rotary or rotatable joint, and may be coupled to the second movable portion 524-1 of the third linear slide via the threaded engagement with the first threaded hole 536. In further example embodiments, the first lead screw 516 and first crank 517 may comprise various other shapes, sizes, dimensions, thicknesses, weights, materials, and/or other characteristics.

The second lead screw 518 may comprise a threaded rod, machined screw, or other similar component that extends parallel to and between the first static portions 521-1, 521-2 of the first and second linear slides, e.g., parallel to the first direction and orthogonal to the second direction. The second lead screw 518 may be in threaded engagement with a second threaded hole 538 of the second movable portion 524-1. By this threaded engagement, rotation of the second lead screw 518 around an axis extending through a center and along a length of the second lead screw 518 may cause corresponding movement of the third linear slide and the second movable portions 522-1, 522-2 of the first and second linear slides along the first static portions 521-1, 521-2 of the first and second linear slides. At one end of the second lead screw 518, e.g., at a second movable portion 524-2 of the fourth linear slide, a second crank 519 may be operatively coupled to rotate the second lead screw 518. The second lead screw 518 and second crank 519 may be formed of various materials, such as aluminum, steel, other metals, plastics, composites, other materials, or combinations thereof. In addition, the second lead screw 518 and second crank 519 may be coupled to the second movable portion 524-2 of the fourth linear slide via a rotary or rotatable joint, and may be coupled to the second movable portion 524-1 of the third linear slide via the threaded engagement with the second threaded hole 538. In further example embodiments, the second lead screw 518 and second crank 519 may comprise various other shapes, sizes, dimensions, thicknesses, weights, materials, and/or other characteristics.

The one or more stops (not shown) may comprise pegs, blocks, endcaps, bumpers, or other movement limiting elements. For example, one or more stops may be coupled to opposite ends of the first static portions 521 of the first and second linear slides, and/or one or more stops may be coupled to opposite ends of the first static portions 523 of the third and fourth linear slides. The stops may be formed of various materials, such as aluminum, steel, other metals, plastics, composites, rubber, silicone, elastomers, other materials, or combinations thereof In addition, the stops may be coupled to respective ones of the first, second, third, and fourth linear slides using fasteners, adhesives, welds, or other types of connectors. In further example embodiments, the stops may comprise various other shapes, sizes, dimensions, thicknesses, weights, materials, and/or other characteristics. In alternative example embodiments, the one or more stops may not be included if movement of the second movable portions 522, 524 of the linear slides is limited by portions of the lead screws 516, 518 and/or the second movable portions 522, 524 themselves.

Figure 6A:
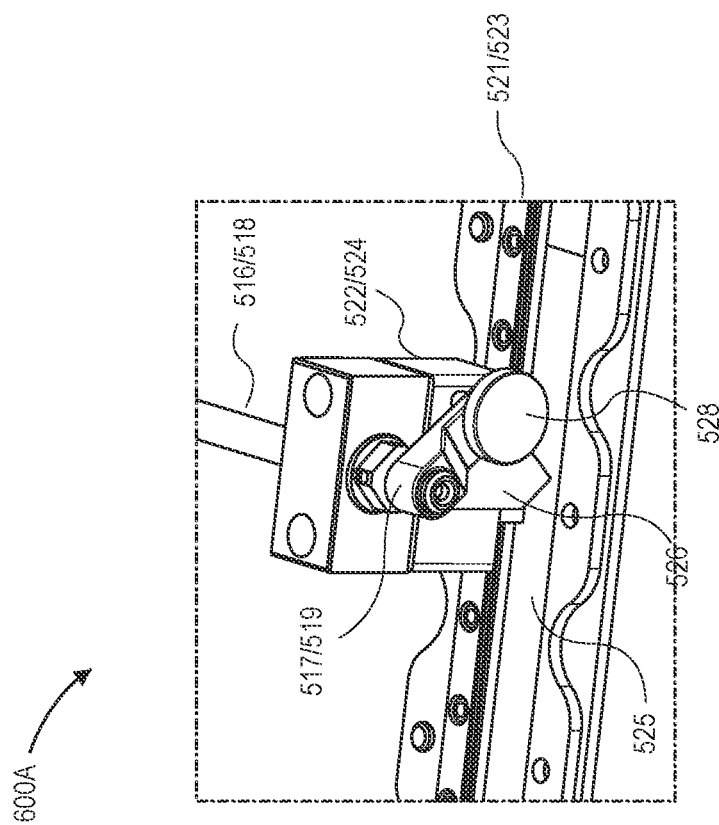
FIG. 6A is schematic diagram of a movement assembly of the second example testing rig having variable mass properties, in accordance with implementations of the present disclosure.

The one or more brakes or locks 528, as shown in FIG. 6A, may comprise wingnuts, screws, bolts, wedges, pegs, blocks, or other movement limiting elements. For example, one or more brakes 528 may be operatively coupled to second movable portions 522, 524 of the linear slides. The one or more brakes 528 may contact, insert into, or engage with parts of the first static portions 521, 523 or second movable portions 522, 524 of the linear slides in order to stop, brake, or otherwise limit movement of the second movable portions 522, 524 relative to the first static portions 521, 523. In the example shown in FIG. 6A, the brake 528 may comprise a screw, nut, or bolt that may be inserted, threaded, or engaged into a portion of a second movable portion 522, 524, and the brake 528 may prevent rotation or movement of a crank 517, 519 associated with a lead screw 516, 518, thereby limiting movement of a second movable portion 522, 524 relative to a first static portion 521, 523. The brakes 528 may be formed of various materials, such as aluminum, steel, other metals, plastics, composites, rubber, silicone, elastomers, other materials, or combinations thereof In addition, the brakes 528 may be coupled to respective ones of the first, second, third, and fourth linear slides using fasteners, adhesives, welds, or other types of connectors. In further example embodiments, the brakes 528 may comprise various other shapes, sizes, dimensions, thicknesses, weights, materials, and/or other characteristics.

FIG. 6A is schematic diagram 600A of a movement assembly of the second example testing rig having variable mass properties, in accordance with implementations of the present disclosure. For example, FIG. 6A may be a close-up, side perspective view of a portion of the movement assembly of the second example testing rig 505 shown in FIG. 5.

As shown in FIG. 6A, one or more of the first, second, third, and fourth linear slides may comprise a first static portion 521, 523 and a second movable portion 522, 524 that is operatively coupled to and moves along the first static portion 521, 523. A position guide 525, e.g., a metric ruler, may be coupled to a part of the first static portion 521, 523. In addition, a position indicator 526, e.g., an arrow or pointer, may be coupled to and move with the second movable portion 522, 524. Further, a lead screw 516, 518 may also be rotatably coupled to the second movable portion 522, 524, and a crank 517, 519 may be coupled to the lead screw 516, 518. The crank 517, 519 may be configured to cause rotation of the lead screw 516, 518, and thereby cause movement of a weight assembly of the testing rig 505. Moreover, one or more brakes 528 may be operatively coupled to the second movable portion 522, 524, and the brakes 528 may be configured to limit rotation or movement of the lead screws 516, 518 and cranks 517, 519, in order to stop or limit movement of the weight assembly of the testing rig 505.

In addition, as shown in FIG. 5, the variable weight assembly of the testing rig 505 may comprise a first threaded hole or orifice 536 of the second movable portion 524-1 to receive the first lead screw 516, a second threaded hole or orifice 538 of the second movable portion 524-1 to receive the second lead screw 518, a weight arm 531, a weight shaft 532, one or more clamps 533, and one or more weights (not shown).

The first threaded hole or orifice 536 of the second movable portion 524-1 may extend substantially parallel with the third linear slide. The first lead screw 516 may be in threaded engagement with the first threaded hole 536, such that rotation of the first lead screw 516 may cause movement of the second movable portion 524-1 along the first static portion 523-1 of the third linear slide. As described herein, movement of the second movable portion 524-1 may cause corresponding movement of the variable weight assembly relative to the base plate 510.

The second threaded hole or orifice 538 of the second movable portion 524-1 may extend substantially orthogonal with the third linear slide. The second lead screw 518 may be in threaded engagement with the second threaded hole 538, such that rotation of the second lead screw 518 may cause movement of the third linear slide along the first and second linear slides, e.g., via the second movable portions 522-1, 522-2 moving along the first static portions 521-1, 521-2 of the first and second linear slides. As described herein, movement of the third linear slide may cause corresponding movement of the variable weight assembly relative to the base plate 510.

The weight arm 531 may comprise an arm, beam, rod, strut, or other component configured to couple variable weights to the second movable portion 524-1 of the third linear slide. For example, the weight arm 531 may be coupled to the second movable portion 524-1 and may extend away from the base plate 510. The weight arm 531 may have various lengths to adjust or modify a distance or position of the variable weights relative to the base plate 510. In additional example embodiments, one or more spacers may be positioned or coupled between the weight arm 531 and the second movable portion 524-1 in order to further adjust or modify a distance or position of the variable weights relative to the base plate 510. Further, the weight arm 531 may include a hole, orifice, clamp, or other receptacle configured to receive and hold a weight shaft 532, as described herein. The weight arm 531 may be formed of various materials, such as aluminum, steel, other metals, plastics, composites, other materials, or combinations thereof. In addition, the weight arm 531 may be coupled to the third linear slide using fasteners, adhesives, welds, or other types of connectors. In further example embodiments, the weight arm 531 may comprise various other shapes, sizes, dimensions, thicknesses, weights, materials, and/or other characteristics.

The weight shaft 532 may comprise an arm, beam, rod, strut, or other component configured to couple variable weights to the second movable portion 524-1 of the third linear slide via the weight arm 531. For example, the weight shaft 532 may be coupled to the hole, orifice, clamp, or other receptacle of the weight arm 531 and may extend in various directions relative to the weight arm 531. The weight shaft 532 may have various diameters, shapes, or lengths to receive variable weights. The weight shaft 532 may be formed of various materials, such as aluminum, steel, other metals, plastics, composites, other materials, or combinations thereof. In addition, the weight shaft 532 may be coupled to the weight arm 531 using fasteners, adhesives, welds, or other types of connectors. In further example embodiments, the weight shaft 532 may comprise various other shapes, sizes, dimensions, thicknesses, weights, materials, and/or other characteristics.

The one or more clamps 533 may comprise collars, couplings, screw clamps, or other types of clamps configured to hold or retain variable weights attached to the weight shaft 532. For example, the clamps 533 may contact, engage with, or fasten tightly onto or around the weight shaft 532, thereby holding or retaining variable weights attached to the weight shaft 532. The clamps 533 may have various diameters, sizes, or shapes. The clamps 533 may be formed of various materials, such as aluminum, steel, other metals, plastics, composites, other materials, or combinations thereof. In addition, the clamps 533 may be coupled to the weight shaft 532 using fasteners, adhesives, welds, or other types of connectors. In further example embodiments, the clamps 533 may comprise various other shapes, sizes, dimensions, thicknesses, weights, materials, and/or other characteristics.

The one or more weights (not shown) may comprise rings, discs, plates, free weights, or other types of weights that may be coupled to the weight shaft 532. For example, the weights may be added, slid, attached, or coupled to the weight shaft 532, and the clamps 533 may then contact, engage with, or fasten tightly onto or around the weight shaft 532, thereby holding or retaining the weights on the weight shaft 532. The weights may have various diameters, sizes, or shapes. In example embodiments, the weights may be sized to incrementally add or subtract weight onto the weight shaft 532, e.g., in increments of 0.5 kg, 1.0 kg, 1 lb, 2 lbs, 5 lbs, or other increments. The weights may be formed of various materials, such as aluminum, steel, other metals, plastics, composites, rubber, silicone, elastomers, other materials, or combinations thereof. In addition, the weights may be coupled to the weight shaft 532 using fasteners, adhesives, welds, or other types of connectors. In further example embodiments, the weights may comprise various other shapes, sizes, dimensions, thicknesses, weights, materials, and/or other characteristics.

FIG. 6B is schematic diagram 600B of a weight assembly of the second example testing rig having variable mass properties, in accordance with implementations of the present disclosure. For example, FIG. 6B may be a close-up, side perspective view of the weight assembly of the second example testing rig 605 shown in FIG. 5.

As shown in FIG. 6B, the third linear slide may comprise a second movable portion 524-1 that is operatively coupled to and moves along a first static portion 523-1. The second movable portion 524-1 may include first and second threaded holes 536, 538 configured to receive and engage with threads of first and second lead screws 516, 518, respectively. A weight arm 531 may be coupled to the second movable portion 524-1 of the third linear slide and extend substantially in a direction away from the base plate 510. The weight arm 531 may receive and couple to a weight shaft 532, and the weight shaft 532 may receive one or more weights that are held or retained on the weight shaft 532 by one or more clamps 533 coupled thereto.

In this manner, the movement assembly described herein may provide variable position and/or orientation of the weight assembly relative to the base plate 510, in order to vary mass properties associated with a testing rig 505. In addition, the weight assembly may receive and couple variable weights or loads to the testing rig 505 via the movement assembly, in order to further vary mass properties associated with the testing rig 505. Moreover, the base plate 510 and/or base plate cover 512 may be formed with various types of materials to vary surface properties associated with the testing rig 505.

Similar to the discussion of FIGS. 4A-4H with respect to the first example testing rig 105, various combinations of the components of the second example testing rig 505 described herein may be included in an example testing rig in order to modify or adjust mass properties of the testing rig as desired. In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 25 kg.

In additional example embodiments, the example testing rig 505 may comprise a controller or control system that is configured to control one or more components of the testing rig 505. The controller may be in communication with other control systems, e.g., a robotic arm or movement system controller, a material handling facility control system, a warehouse management system, or other control systems, via wired or wireless communication networks.

In further example embodiments, the example testing rig 505 may also include one or more actuators. For example, the actuators may be associated with one or more of the linear slides, lead screws, and/or cranks to cause movement of the second movable portions relative to the first static portions of the linear slides. In addition, the actuators may be associated with one or more of the brakes or locks to stop or limit movement of the second movable portions relative to the first static portions of the linear slides. Various types of actuators may be included, e.g., linear actuators, rotary actuators, servos, solenoids, or other types of actuators.

In further example embodiments, the example testing rig 505 may also include one or more sensors. For example, the sensors may be associated with one or more of the linear slides, lead screws, and/or cranks to detect or measure position, speed, or acceleration of the second movable portions relative to the first static portions of the linear slides. In addition, the sensors may be associated with one or more actuators that may cause or limit movement of the second movable portions relative to the first static portions of the linear slides. Further, the sensors may be associated with portions of the weight assembly, linear slides, lead screws, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 7A:
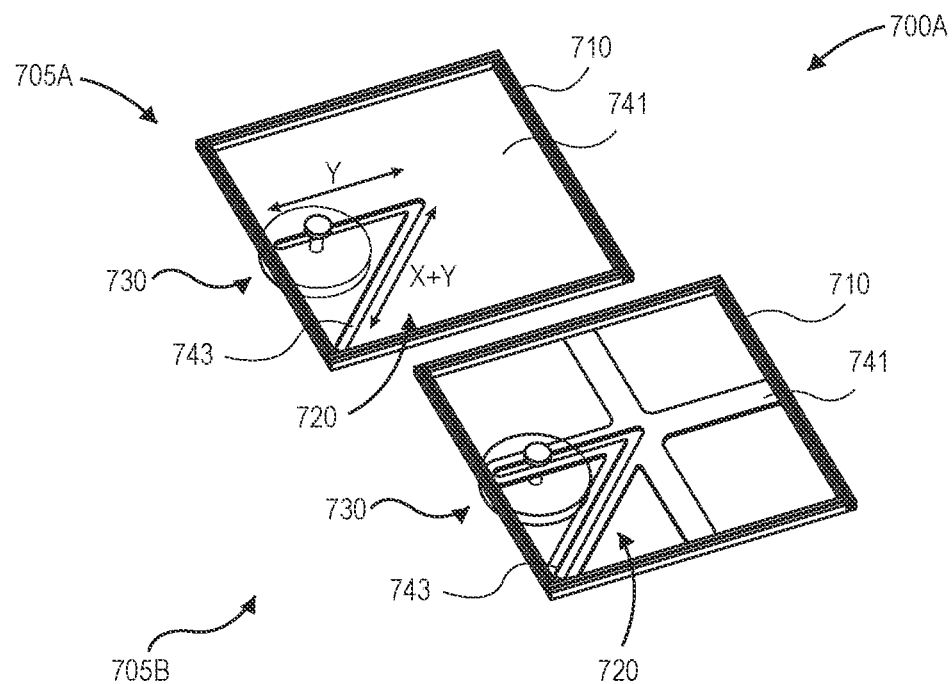
FIG. 7A is a schematic, perspective view diagram of a third example testing rig having variable mass properties, in accordance with implementations of the present disclosure.

FIG. 7A is a schematic, perspective view diagram 700A of a third example testing rig having variable mass properties, in accordance with implementations of the present disclosure. The testing rig shown and described in FIG. 7A may include any and all of the features of the testing rigs as shown and described at least with respect to FIGS. 1-6B.

As shown in FIG. 7A, the example testing rig 705A, 705B may comprise a base plate 710, a movement assembly 720, and a weight assembly 730. Further, the movement assembly 720 may comprise a guide track plate 741 and one or more guide tracks 743.

The base plate 710 may include features similar to the base plates 110, 510 described at least with respect to FIGS. 1, 2, and 5. In addition, the weight assembly 730 may also include features similar to the weight assemblies described at least with respect to FIGS. 1, 2, 3B, 5, and 6B.

The movement assembly 720 may comprise a guide track plate 741 that is coupled to the base plate 710. The guide track plate 741 may comprise a substantially flat plate or sheet of material that may be rectangular, square, or other regular or irregular shapes. In example embodiments, the guide track plate 741 may be approximately 22.25" long by approximately 18.25" wide. The guide track plate 741 may be formed of various materials, such as aluminum, steel, other metals, plastics, composites, other materials, or combinations thereof. In further example embodiments, the guide track plate 741 may comprise various other shapes, sizes, dimensions, thicknesses, weights, materials, and/or other characteristics.

The upper illustration of FIG. 7A shows a guide track plate 741 of a testing rig 705A that comprises a substantially complete plate, surface, or sheet of material that is coupled to the base plate 710, whereas the lower illustration of FIG. 7A shows a guide track plate 741 of a testing rig 705B that comprises a plate, surface, or sheet of material with one or more portions removed, e.g., to reduce weight.

In addition, the movement assembly 720 may comprise one or more guide tracks 743 disposed within the guide track plate 741. The guide tracks 743 may be configured to receive a portion of the weight assembly 730 and enable movement or sliding of the weight assembly 730 along the guide tracks 743 to various positions or orientations relative to the base plate 710.

In the example testing rig 705A, 705B, the weight assembly 730 may be movably or slidably coupled to one or more guide tracks 743 of the guide track plate 741 of the movement assembly 720. For example, the weight assembly 730 may be positioned on one side of the guide track plate, and a bolt, screw, pin, or other retaining element may be positioned on an opposite side of the guide track plate and coupled to the weight assembly 730 through a portion of the guide tracks 743. In this manner, the weight assembly 730 may be retained within the guide tracks 743, while still being movable or slidable along the guide tracks 743. In addition, the bolt, screw, pin, or other retaining element may be tightly fastened or engaged with the weight assembly 730 and/or guide tracks 743 in order to brake or lock the weight assembly 730 at a desired position or orientation along the guide tracks 743.

In this manner, the movement assembly 720 described herein may provide variable position and/or orientation of the weight assembly 730 relative to the base plate 710, in order to vary mass properties associated with a testing rig 705A, 705B. In addition, the weight assembly 730 may receive and couple variable weights or loads to the testing rig 705A, 70B via the movement assembly 720, in order to further vary mass properties associated with the testing rig 705A, 705B. Moreover, the base plate 710 and/or base plate cover may be formed with various types of materials to vary surface properties associated with the testing rig 705A, 705B.

Similar to the discussion of FIGS. 4A-4H with respect to the first example testing rig 105, various combinations of the components of the third example testing rig 705A, 705B described herein may be included in an example testing rig in order to modify or adjust mass properties of the testing rig as desired. In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 25 kg.

In additional example embodiments, the example testing rig 705A, 705B may comprise a controller or control system that is configured to control one or more components of the testing rig 705A, 705B. The controller may be in communication with other control systems, e.g., a robotic arm or movement system controller, a material handling facility control system, a warehouse management system, or other control systems, via wired or wireless communication networks.

In further example embodiments, the example testing rig 705A, 705B may also include one or more actuators. For example, the actuators may be associated with one or more of the movement assemblies, guide tracks, and/or weight assemblies to cause movement of the weight assemblies along the guide tracks. In addition, the actuators may be associated with one or more of the brakes or locks to stop or limit movement of the weight assemblies along the guide tracks. Various types of actuators may be included, e.g., linear actuators, rotary actuators, servos, solenoids, or other types of actuators.

In further example embodiments, the example testing rig 705A, 705B may also include one or more sensors. For example, the sensors may be associated with one or more of the movement assemblies, guide tracks, and/or weight assemblies to detect or measure position, speed, or acceleration of the weight assemblies along the guide tracks. In addition, the sensors may be associated with one or more actuators that may cause or limit movement of the weight assemblies along the guide tracks. Further, the sensors may be associated with portions of the movement assemblies, weight assemblies, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 7B:
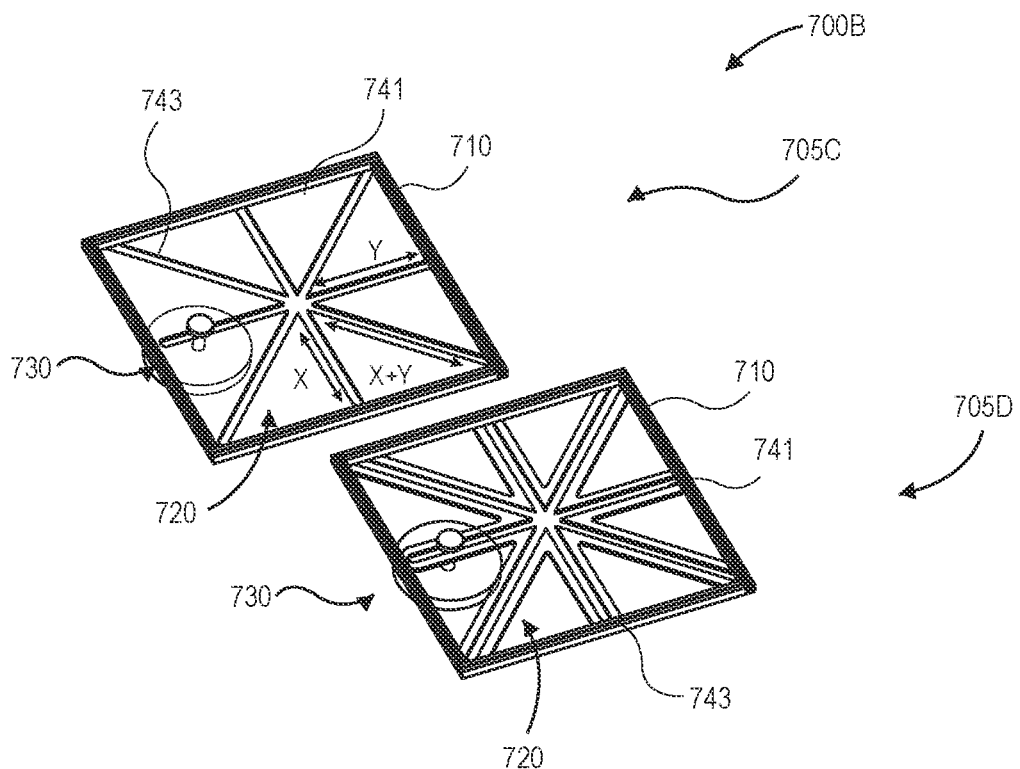
FIG. 7B is a schematic, perspective view diagram of a fourth example testing rig having variable mass properties, in accordance with implementations of the present disclosure.

FIG. 7B is a schematic, perspective view diagram 700B of a fourth example testing rig having variable mass properties, in accordance with implementations of the present disclosure. The testing rig shown and described in FIG. 7B may include any and all of the features of the testing rigs as shown and described at least with respect to FIGS. 1-7A.

As shown in FIG. 7B, the example testing rig 705C, 705D may comprise a base plate 710, a movement assembly 720, and a weight assembly 730. Further, the movement assembly 720 may comprise a guide track plate 741 and one or more guide tracks 743.

The base plate 710 may include features similar to the base plates 110, 510 described at least with respect to FIGS. 1, 2, and 5. In addition, the weight assembly 730 may also include features similar to the weight assemblies described at least with respect to FIGS. 1, 2, 3B, 5, and 6B.

The movement assembly 720 may comprise a guide track plate 741 that is coupled to the base plate 710. The guide track plate 741 may comprise a substantially flat plate or sheet of material that may be rectangular, square, or other regular or irregular shapes. In example embodiments, the guide track plate 741 may be approximately 22.25" long by approximately 18.25" wide. The guide track plate 741 may be formed of various materials, such as aluminum, steel, other metals, plastics, composites, other materials, or combinations thereof. In further example embodiments, the guide track plate 741 may comprise various other shapes, sizes, dimensions, thicknesses, weights, materials, and/or other characteristics.

The upper illustration of FIG. 7B shows a guide track plate 741 of a testing rig 705C that comprises a substantially complete plate, surface, or sheet of material that is coupled to the base plate 710, whereas the lower illustration of FIG. 7B shows a guide track plate 741 of a testing rig 705D that comprises a plate, surface, or sheet of material with one or more portions removed, e.g., to reduce weight.

In addition, the movement assembly 720 may comprise one or more guide tracks 743 disposed within the guide track plate 741. The guide tracks 743 may be configured to receive a portion of the weight assembly 730 and enable movement or sliding of the weight assembly 730 along the guide tracks 743 to various positions or orientations relative to the base plate 710.

In the example testing rig 705C, 705D, the weight assembly 730 may be movably or slidably coupled to one or more guide tracks 743 of the guide track plate 741 of the movement assembly 720. For example, the weight assembly 730 may be positioned on one side of the guide track plate, and a bolt, screw, pin, or other retaining element may be positioned on an opposite side of the guide track plate and coupled to a portion of the weight assembly 730 through the guide tracks 743. In this manner, the weight assembly 730 may be retained within the guide tracks 743, while still being movable or slidable along the guide tracks 743. In addition, the bolt, screw, pin, or other retaining element may be tightly fastened or engaged with the weight assembly 730 and/or guide tracks 743 in order to brake or lock the weight assembly 730 at a desired position or orientation along the guide tracks 743.

In this manner, the movement assembly 720 described herein may provide variable position and/or orientation of the weight assembly 730 relative to the base plate 710, in order to vary mass properties associated with a testing rig 705C, 705D. In addition, the weight assembly 730 may receive and couple variable weights or loads to the testing rig 705C, 705D via the movement assembly 720, in order to further vary mass properties associated with the testing rig 705C, 705D. Moreover, the base plate 710 and/or base plate cover may be formed with various types of materials to vary surface properties associated with the testing rig 705C, 705D.

Similar to the discussion of FIGS. 4A-4H with respect to the first example testing rig 105, various combinations of the components of the fourth example testing rig 705C, 705D described herein may be included in an example testing rig in order to modify or adjust mass properties of the testing rig as desired. In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 25 kg.

In additional example embodiments, the example testing rig 705C, 705D may comprise a controller or control system that is configured to control one or more components of the testing rig 705C, 705D. The controller may be in communication with other control systems, e.g., a robotic arm or movement system controller, a material handling facility control system, a warehouse management system, or other control systems, via wired or wireless communication networks.

In further example embodiments, the example testing rig 705C, 705D may also include one or more actuators. For example, the actuators may be associated with one or more of the movement assemblies, guide tracks, and/or weight assemblies to cause movement of the weight assemblies along the guide tracks. In addition, the actuators may be associated with one or more of the brakes or locks to stop or limit movement of the weight assemblies along the guide tracks. Various types of actuators may be included, e.g., linear actuators, rotary actuators, servos, solenoids, or other types of actuators.

In further example embodiments, the example testing rig 705C, 705D may also include one or more sensors. For example, the sensors may be associated with one or more of the movement assemblies, guide tracks, and/or weight assemblies to detect or measure position, speed, or acceleration of the weight assemblies along the guide tracks. In addition, the sensors may be associated with one or more actuators that may cause or limit movement of the weight assemblies along the guide tracks. Further, the sensors may be associated with portions of the movement assemblies, weight assemblies, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 8A:
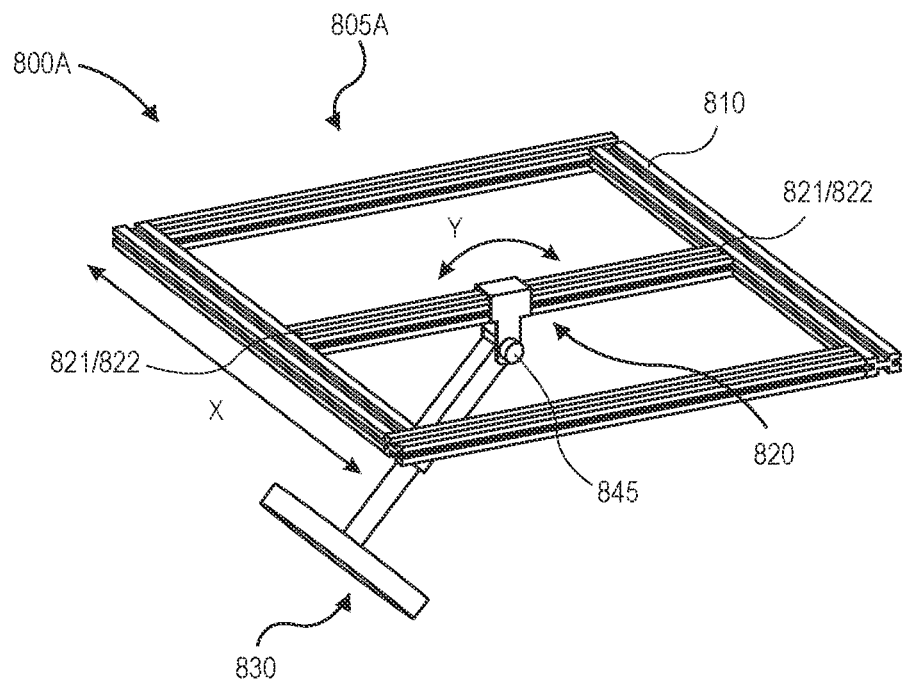
FIG. 8A is a schematic, perspective view diagram of a fifth example testing rig having variable mass properties, in accordance with implementations of the present disclosure.

FIG. 8A is a schematic, perspective view diagram 800A of a fifth example testing rig having variable mass properties, in accordance with implementations of the present disclosure. The testing rig shown and described in FIG. 8A may include any and all of the features of the testing rigs as shown and described at least with respect to FIGS. 1-7B.

As shown in FIG. 8A, the example testing rig 805A may comprise a base plate 810, a movement assembly 820, and a weight assembly 830. Further, the movement assembly 820 may comprise one or more linear slides 821, 822 and a rotary or rotatable joint 845.

The base plate 810 may include features similar to the base plates 110, 510, 710 described at least with respect to FIGS. 1, 2, 5, 7A, and 7B. In addition, the weight assembly 830 may also include features similar to the weight assemblies described at least with respect to FIGS. 1, 2, 3B, 5, 6B, 7A, and 7B.

The movement assembly 820 may comprise one or more linear slides 821, 822 coupled to the base plate 810, and the linear slides 821, 822 may also include features similar to the movement assemblies described at least with respect to FIGS. 1-3B, and 5-6B. For example, first static portions of the linear slides 821, 822 may be coupled to portions of the base plate 810. In addition, a crossbar to which the weight assembly 830 is coupled may be movably or slidably coupled to second movable portions of the linear slides 821, 822 at opposite ends of the crossbar, such that the crossbar and weight assembly 830 may move or slide relative to the base plate 810, e.g., along the X-direction as shown in FIG. 8A.

In addition, the movement assembly 820 may comprise a rotatable joint 845, e.g., a hinge, pivot joint, rotary linkage, swivel joint, or other rotary joint, to which the weight assembly 830 is movably or rotatably coupled. For example, a rotation axis of the rotatable joint 845 may extend substantially parallel to a movement or sliding direction of the linear slides 821, 822, e.g., substantially parallel to the X-direction as shown in FIG. 8A. As a result, the rotatable joint 845 may enable movement or rotation of the weight assembly 830 in an arc or curve that is substantially transverse to the X-direction, e.g., along the Y-direction arc or curve as shown in FIG. 8A.

In the example testing rig 805A, the weight assembly 830 may be movably, slidably, or rotatably coupled to the base plate 810 via the linear slides 821, 822 and the rotatable joint 845 of the movement assembly 820. For example, the weight assembly 830 may be moved, slid, or translated along the linear slides 821, 822, and/or the weight assembly 830 may be rotated via the rotatable joint 845. In this manner, the weight assembly 830 may be moved, translated, and/or rotated to a desired position or orientation. In addition, as described herein, the linear slides 821, 822 and/or the rotatable joint 845 may include brakes or locks to hold or retain the weight assembly 830 in a desired position or orientation.

In this manner, the movement assembly 820 described herein may provide variable position and/or orientation of the weight assembly 830 relative to the base plate 810, in order to vary mass properties associated with a testing rig 805A. In addition, the weight assembly 830 may receive and couple variable weights or loads to the testing rig 805A via the movement assembly 820, in order to further vary mass properties associated with the testing rig 805A. Moreover, the base plate 810 and/or base plate cover may be formed with various types of materials to vary surface properties associated with the testing rig 805A.

Similar to the discussion of FIGS. 4A-4H with respect to the first example testing rig 105, various combinations of the components of the fifth example testing rig 805A described herein may be included in an example testing rig in order to modify or adjust mass properties of the testing rig as desired. In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 25 kg.

In additional example embodiments, the example testing rig 805A may comprise a controller or control system that is configured to control one or more components of the testing rig 805A. The controller may be in communication with other control systems, e.g., a robotic arm or movement system controller, a material handling facility control system, a warehouse management system, or other control systems, via wired or wireless communication networks.

In further example embodiments, the example testing rig 805A may also include one or more actuators. For example, the actuators may be associated with one or more of the movement assemblies and/or weight assemblies to cause movement of the weight assemblies via the linear slides and/or the rotatable joint. In addition, the actuators may be associated with one or more of the brakes or locks to stop or limit movement of the weight assemblies via the linear slides and/or the rotatable joint. Various types of actuators may be included, e.g., linear actuators, rotary actuators, servos, solenoids, or other types of actuators.

In further example embodiments, the example testing rig 805A may also include one or more sensors. For example, the sensors may be associated with one or more of the movement assemblies and/or weight assemblies to detect or measure position, speed, or acceleration of the weight assemblies via the linear slides and/or the rotatable joint. In addition, the sensors may be associated with one or more actuators that may cause or limit movement of the weight assemblies via the linear slides and/or the rotatable joint. Further, the sensors may be associated with portions of the movement assemblies, weight assemblies, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 8B:
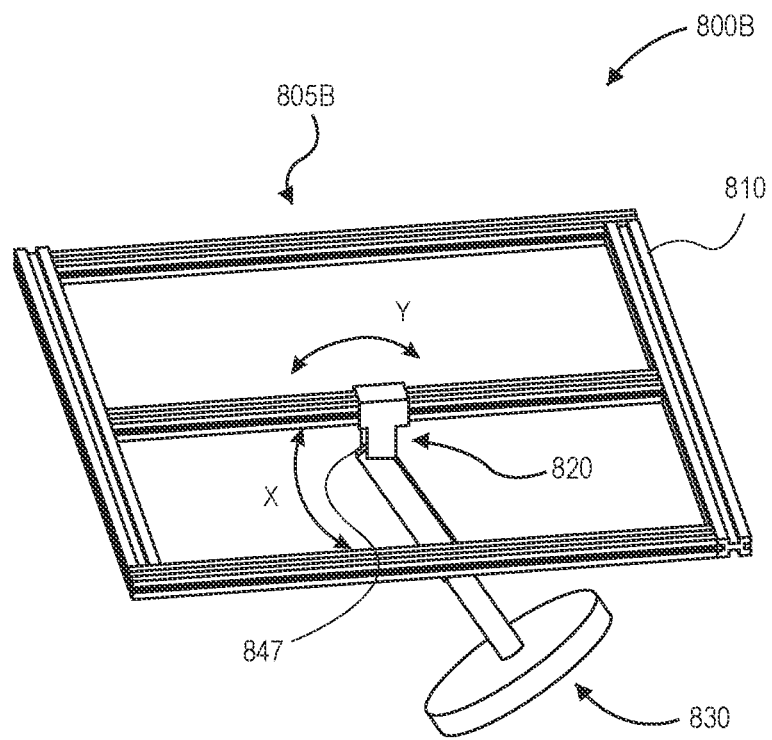
FIG. 8B is a schematic, perspective view diagram of a sixth example testing rig having variable mass properties, in accordance with implementations of the present disclosure.

FIG. 8B is a schematic, perspective view diagram 800B of a sixth example testing rig having variable mass properties, in accordance with implementations of the present disclosure. The testing rig shown and described in FIG. 8B may include any and all of the features of the testing rigs as shown and described at least with respect to FIGS. 1-8A.

As shown in FIG. 8B, the example testing rig 805B may comprise a base plate 810, a movement assembly 820, and a weight assembly 830. Further, the movement assembly 820 may comprise a bi-directional or universal rotary or rotatable joint 847.

The base plate 810 may include features similar to the base plates 110, 510, 710 described at least with respect to FIGS. 1, 2, 5, 7A, and 7B. In addition, the weight assembly 830 may also include features similar to the weight assemblies described at least with respect to FIGS. 1, 2, 3B, 5, 6B, 7A, and 7B.

The movement assembly 820 may comprise a bi-directional or universal rotatable joint 847, e.g., a bi-directional hinge, a universal hinge, a gimbal mechanism, a ball linkage or joint, a multi-directional pivot or swivel joint, or other multi-directional or universal rotary joint, to which the weight assembly 830 is movably or rotatably coupled. For example, the rotatable joint 847 may enable movement or rotation in at least two substantially orthogonal or transverse directions. As a result, the rotatable joint 847 may enable movement or rotation of the weight assembly 830 in an arc or curve that is substantially along a first direction, e.g., along the X-direction arc or curve as shown in FIG. 8B, as well as enable movement or rotation of the weight assembly 830 in an arc or curve that is substantially along a second direction substantially orthogonal or transverse to the first direction, e.g., along the Y-direction arc or curve as shown in FIG. 8B.

In the example testing rig 805B, the weight assembly 830 may be movably or rotatably coupled to the base plate 810 via the rotatable joint 847 of the movement assembly 820. For example, the weight assembly 830 may be moved or rotated via the rotatable joint 847. In this manner, the weight assembly 830 may be moved and/or rotated to a desired position or orientation. In addition, as described herein, the rotatable joint 847 may include brakes or locks to hold or retain the weight assembly 830 in a desired position or orientation.

In this manner, the movement assembly 820 described herein may provide variable position and/or orientation of the weight assembly 830 relative to the base plate 810, in order to vary mass properties associated with a testing rig 805B. In addition, the weight assembly 830 may receive and couple variable weights or loads to the testing rig 805B via the movement assembly 820, in order to further vary mass properties associated with the testing rig 805B. Moreover, the base plate 810 and/or base plate cover may be formed with various types of materials to vary surface properties associated with the testing rig 805B.

Similar to the discussion of FIGS. 4A-4H with respect to the first example testing rig 105, various combinations of the components of the sixth example testing rig 805B described herein may be included in an example testing rig in order to modify or adjust mass properties of the testing rig as desired. In example embodiments, a testing rig may have a variable weight range between approximately 2.5 kg and approximately 25 kg. In other example embodiments, a testing rig may have other variable weight ranges, including portions of weight ranges less than approximately 2.5 kg and/or portions of weight ranges greater than approximately 25 kg.

In additional example embodiments, the example testing rig 805B may comprise a controller or control system that is configured to control one or more components of the testing rig 805B. The controller may be in communication with other control systems, e.g., a robotic arm or movement system controller, a material handling facility control system, a warehouse management system, or other control systems, via wired or wireless communication networks.

In further example embodiments, the example testing rig 805B may also include one or more actuators. For example, the actuators may be associated with one or more of the movement assemblies and/or weight assemblies to cause movement of the weight assemblies via the rotatable joint. In addition, the actuators may be associated with one or more of the brakes or locks to stop or limit movement of the weight assemblies via the rotatable joint. Various types of actuators may be included, e.g., linear actuators, rotary actuators, servos, solenoids, or other types of actuators.

In further example embodiments, the example testing rig 805B may also include one or more sensors. For example, the sensors may be associated with one or more of the movement assemblies and/or weight assemblies to detect or measure position, speed, or acceleration of the weight assemblies via the rotatable joint. In addition, the sensors may be associated with one or more actuators that may cause or limit movement of the weight assemblies via the rotatable joint. Further, the sensors may be associated with portions of the movement assemblies, weight assemblies, base plate, or base plate cover to detect loads, weights, moments, weight distribution, center of gravity, or other forces or torques applied to such components. Various types of sensors may be included, e.g., proximity sensors, imaging devices, position sensors or encoders, motor encoders, accelerometers, gyroscopes, force or torque sensors, or other types of sensors.

Using various combinations of a controller, actuators, and sensors, mass properties of the example testing rig may be detected, measured, modified, or adjusted using automated, robotic, or programmatic methods, instead of manual methods. For example, a controller may detect current mass properties of the example testing rig based on data from one or more sensors, may receive desired mass properties of the example testing rig, may determine desired positions and orientations of portions of the example testing rig to match the desired mass properties, and may instruct movement, modification, or adjustment of components of the example testing rig via one or more actuators to the desired positions and orientations.

Figure 9:
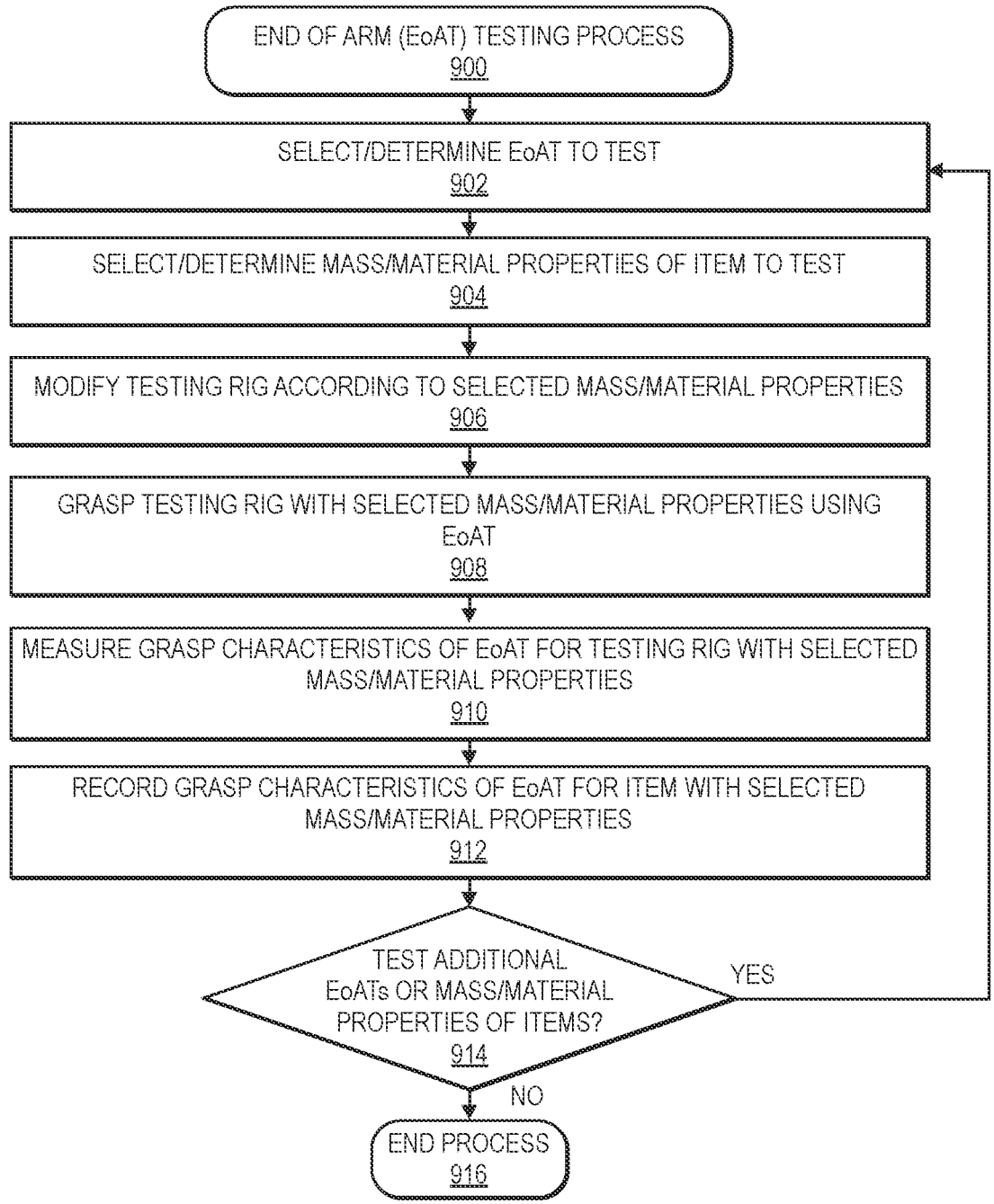
FIG. 9 is a flow diagram illustrating an example end of arm tool testing process, in accordance with implementations of the present disclosure.

FIG. 9 is a flow diagram illustrating an example end of arm tool testing process 900, in accordance with implementations of the present disclosure.

The process 900 may begin by selecting or determining an end of arm tool (EoAT) to test, as at 902. For example, a robotic arm or other movement system may have an associated EoAT or end effector that is used to grasp items or objects. In example embodiments, the EoAT may use suction or vacuum to grasp objects. In other example embodiments, the EoAT may use mechanical grasping or pinching, or other methods to grasp objects. Various grasping characteristics or parameters may be associated with the EoAT, such as number, size, configuration, or arrangement of suction cups, amount or strength associated with suction or vacuum (e.g., measured in atmospheres, pounds per square inch, kilopascals, or other units), number, size, configuration, or arrangement of mechanical grasping or pinching elements, forces associated with mechanical grasping or pinching (e.g., measured in Newtons, pound-force, or other units), or other EoAT parameters. Further, a control system may select or determine, or receive a selection or determination of, the EoAT to test.

The process 900 may continue by selecting or determining mass and/or material properties of an item to test, as at 904. For example, mass and/or material properties of a selected item may be determined, and an example testing rig may be selected to simulate or replicate the mass and/or material properties. The selected material properties may relate to material and/or surface properties of a portion of the item that is to be grasped, e.g., cardboard, plastic, or other materials. In addition, the selected mass properties may relate to various mass properties of the item such as weights, moments, weight distribution, center of gravity, or others. Further, a control system may select or determine, or receive a selection or determination of, the mass and/or material properties of the item to test.

The process 900 may proceed by modifying the testing rig according to the selected mass and/or material properties, as at 906. For example, the example testing rig may be modified or adjusted to have a base plate cover with material and/or surface properties based on the selected material properties of the portion of the item to be grasped, e.g., cardboard, plastic, or other materials. In addition, the example testing rig may be modified or adjusted to have a total weight of a weight assembly, as well as a position or orientation of the weight assembly relative to the base plate of the example testing rig, based on the selected mass properties of the item. As described herein, the position or orientation of the weight assembly may be modified by moving the weight assembly relative to the base plate via a movement assembly of the testing rig. Further, a control system may instruct or command modification of the testing rig according to the selected mass and/or material properties.

The process 900 may then continue to grasp the testing rig with the selected mass and/or material properties using the EoAT, as at 908. For example, a robotic arm or other movement system having the associated EoAT or end effector may grasp the example testing rig that has been modified or adjusted based on the selected mass and/or material properties. In addition, the grasping may comprise additional movements, maneuvers, or operations, such as lifting, translating, rotating, lowering, releasing, or other operations. Further, a control system may instruct or command grasping of the testing rig having the selected mass and/or material properties using the EoAT.

The process 900 may proceed to measure grasp characteristics of the EoAT for the testing rig with the selected mass and/or material properties, as at 910. For example, one or more sensors may be associated with the robotic arm or movement system, the EoAT or end effector, and/or portions of the testing rig. Various types of sensors may be included, e.g., proximity sensors, imaging devices, position sensors or encoders, motor encoders, accelerometers, gyroscopes, force or torque sensors, or other types of sensors. Various grasp characteristics associated with grasping of the testing rig by the EoAT may be detected or measured by the sensors. For example, the various grasp characteristics may include an amount or strength associated with suction or vacuum, forces associated with mechanical grasping or pinching, forces or moments between the EoAT and the testing rig, weight distribution or center of gravity of the testing rig, positions or orientations of the testing rig relative to the EoAT, movements or accelerations of the testing rig relative to the EoAT, successful or unsuccessful grasping of the testing rig, unintentional or accidental release of the testing rig, or other grasp characteristics. Further, a control system may receive, from the sensors, data associated with various grasp characteristics of the EoAT for the testing rig.

The process 900 may then continue by recording the grasp characteristics of the EoAT for the item with the selected mass and/or material properties, as at 912. For example, data associated with various grasp characteristics of the EoAT for the testing rig that is received from the sensors may be stored in a memory, e.g., a database, table, remote or cloud storage, or other data storage. Further, a control system may record or store the data associated with various grasp characteristics of the EoAT for the item.

The process 900 may proceed by determining whether any additional EoATs or mass and/or material properties of one or more items are to be tested, as at 914. For example, grasp characteristics of the currently selected EoAT for a plurality of items having different mass and/or material properties may be tested, measured, and/or recorded. In addition, grasp characteristics of the currently selected item by a plurality of different EoATs may be tested, measured, and/or recorded. Further, grasp characteristics for a plurality of different EoATs and a plurality of items having different mass and/or material properties may be tested, measured, and/or recorded. Further, a control system may determine whether any additional EoATs and/or items are to be tested.

If any additional EoATs and/or items are to be tested, the process 900 may return to 902 and repeat for a different combination of an EoAT and an item. If, however, no additional EoATs and/or items are to be tested, the process 900 may end, as at 916.

Using the example testing rigs described herein, various mass and/or material properties of a plurality of different items may be safely, efficiently, and reliably simulated or replicated. In addition, a plurality of different end effectors may be selected and used to test, measure, and/or record grasp characteristics of various combinations of end effectors and items. In this manner, capabilities of end effectors and associated robotic arms or movement systems may be safely, efficiently, and reliably tested, measured, and/or recorded to facilitate various material handling operations or processes.

Figure 10:
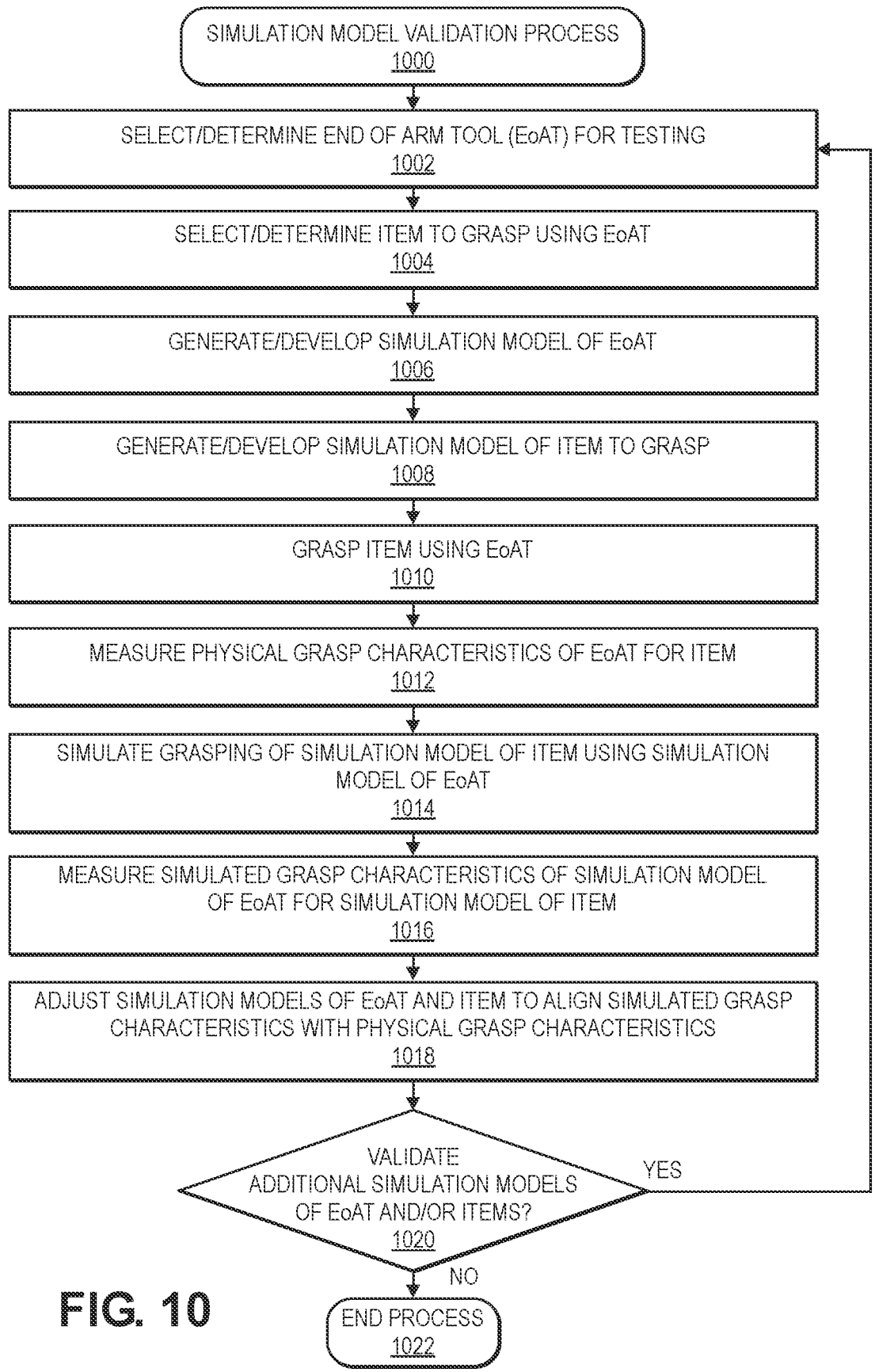
FIG. 10 is a flow diagram illustrating an example simulation model validation process, in accordance with implementations of the present disclosure.

FIG. 10 is a flow diagram illustrating an example simulation model validation process 1000, in accordance with implementations of the present disclosure.

The process 1000 may begin by selecting or determining an end of arm tool (EoAT) for testing, as at 1002. For example, a robotic arm or other movement system may have an associated EoAT or end effector that is used to grasp items or objects. In example embodiments, the EoAT may use suction or vacuum to grasp objects. In other example embodiments, the EoAT may use mechanical grasping or pinching, or other methods to grasp objects. Various grasping characteristics or parameters may be associated with the EoAT, such as number, size, configuration, or arrangement of suction cups, amount or strength associated with suction or vacuum (e.g., measured in atmospheres, pounds per square inch, kilopascals, or other units), number, size, configuration, or arrangement of mechanical grasping or pinching elements, forces associated with mechanical grasping or pinching (e.g., measured in Newtons, pound-force, or other units), or other EoAT parameters. Further, a control system may select or determine, or receive a selection or determination of, the EoAT to test.

The process 1000 may continue by selecting or determining an item to grasp using the EoAT, as at 1004. For example, mass and/or material properties of a selected item may be determined, and an example testing rig may be selected to simulate or replicate the mass and/or material properties. The selected material properties may relate to material and/or surface properties of a portion of the item that is to be grasped, e.g., cardboard, plastic, or other materials. In addition, the selected mass properties may relate to various mass properties of the item such as weights, moments, weight distribution, center of gravity, or others. Moreover, the example testing rig may be modified or adjusted to have a base plate cover with material and/or surface properties based on the selected material properties of the portion of the item to be grasped, e.g., cardboard, plastic, or other materials. In addition, the example testing rig may be modified or adjusted to have a total weight of a weight assembly, as well as a position or orientation of the weight assembly relative to the base plate of the example testing rig, based on the selected mass properties of the item. As described herein, the position or orientation of the weight assembly may be modified by moving the weight assembly relative to the base plate via a movement assembly of the testing rig. Further, a control system may select or determine, or receive a selection or determination of, the item having associated mass and/or material properties to grasp using the EoAT, and the control system may instruct or command modification of the testing rig according to the selected mass and/or material properties.

The process 1000 may proceed by generating or developing a simulation model of the EoAT, as at 1006. For example, various simulation programs or applications may be used to generate a simulation model of the EoAT, e.g., a physics-based simulation model. The simulation model of the EoAT may be generated to match as closely as possible the characteristics or parameters of the real-world, physical EoAT. Further, a control system may instruct or command generation of the simulation model of the EoAT.

The process 1000 may continue to generate or develop a simulation model of the item to grasp, as at 1008. For example, various simulation programs or applications may be used to generate a simulation model of the item, e.g., a physics-based simulation model. The simulation model of the item may be generated to match as closely as possible the characteristics or parameters of the real-world, physical item, e.g., including mass and/or material properties of the item. Further, a control system may instruct or command generation of the simulation model of the item.

The process 1000 may then proceed to grasp the item using the EoAT, as at 1010. For example, a robotic arm or other movement system having the associated EoAT or end effector may grasp the example testing rig that has been modified or adjusted based on the selected mass and/or material properties. In addition, the grasping may comprise additional movements, maneuvers, or operations, such as lifting, translating, rotating, lowering, releasing, or other operations. Further, a control system may instruct or command grasping of the testing rig having the selected mass and/or material properties using the EoAT.

The process 1000 may continue with measuring physical grasp characteristics of the EoAT for the item, as at 1012. For example, one or more sensors may be associated with the robotic arm or movement system, the EoAT or end effector, and/or portions of the testing rig. Various types of sensors may be included, e.g., proximity sensors, imaging devices, position sensors or encoders, motor encoders, accelerometers, gyroscopes, force or torque sensors, or other types of sensors. Various grasp characteristics associated with grasping of the testing rig by the EoAT may be detected or measured by the sensors. For example, the various grasp characteristics may include an amount or strength associated with suction or vacuum, forces associated with mechanical grasping or pinching, forces or moments between the EoAT and the testing rig, weight distribution or center of gravity of the testing rig, positions or orientations of the testing rig relative to the EoAT, movements or accelerations of the testing rig relative to the EoAT, successful or unsuccessful grasping of the testing rig, unintentional or accidental release of the testing rig, or other grasp characteristics. Further, a control system may receive, from the sensors, data associated with various grasp characteristics of the EoAT for the testing rig.

The process 1000 may then proceed with simulating grasping of the simulation model of the item using the simulation model of the EoAT, as at 1014. For example, a simulation model of a robotic arm or other movement system having the associated simulation model of the EoAT or end effector may simulate grasping of the simulation model of the item. Further, a control system may instruct or command simulation of grasping of the simulation model of the item using the simulation model of the EoAT.

The process 1000 may continue by measuring simulated grasp characteristics of the simulation model of the EoAT for the simulation model of the item, as at 1016. For example, various simulated grasp characteristics associated with grasping of the simulation model of the item by the simulation model of the EoAT may be detected or measured by the simulation program or application. For example, the various simulated grasp characteristics may include an amount or strength associated with suction or vacuum, forces associated with mechanical grasping or pinching, forces or moments between the EoAT and the testing rig, weight distribution or center of gravity of the testing rig, positions or orientations of the testing rig relative to the EoAT, movements or accelerations of the testing rig relative to the EoAT, successful or unsuccessful grasping of the testing rig, unintentional or accidental release of the testing rig, or other grasp characteristics. Further, a control system may receive, from the simulation program or application, data associated with various simulated grasp characteristics of the simulation model of the EoAT for the simulation model of the item.

The process 1000 may proceed by adjusting simulation models of the EoAT and the item to align the simulated grasp characteristics with the physical grasp characteristics, as at 1018. For example, the data associated with physical grasp characteristics received from the sensors responsive to grasping the testing rig by the EoAT may be compared with simulated grasp characteristics received from the simulation program or application responsive to simulating grasping of the simulation model of the item by the simulation model of the EoAT. Based on the comparison of the physical grasp characteristics and the simulated grasp characteristics, one or more differences may be identified or determined between the EoAT and the simulation model of the EoAT, and/or between the testing rig having selected mass and/or material properties associated with an item and the simulation model of the item. Then, the simulation models of the EoAT and/or the item may be adjusted, tuned, corrected, or otherwise modified to align or match the simulated grasp characteristics with the physical grasp characteristics. Further, a control system may receive and process the physical grasp characteristics and the simulated grasp characteristics to determine differences and to align the simulation models with the real-world, physical EoAT and/or item.

The process 1000 may then continue to determine whether any additional simulation models of EoATs and/or items are to be validated, as at 1020. For example, simulated grasp characteristics of a plurality of simulation models of items having different mass and/or material properties by a simulation model of a currently selected EoAT may be tested, measured, and/or compared against real-world, physical grasp characteristics of an adjustable testing rig and EoAT. In addition, simulated grasp characteristics of a simulation model of a currently selected item by a plurality of simulation models of EoATs may be tested, measured, and/or compared against real-world, physical grasp characteristics of an adjustable testing rig and a plurality of EoATs. Further, simulated grasp characteristics of a plurality of simulation models of items having different mass and/or material properties by a plurality of different simulation models of EoATs may be tested, measured, and/or compared against real-world, physical grasp characteristics of an adjustable testing rig and a plurality of EoATs. Further, a control system may determine whether any additional simulation models of EoATs and/or items are to be validated.

If any additional simulation models of EoATs and/or items are to be validated, the process 1000 may return to 1002 and repeat for a different combination of simulation models of an EoAT and an item. If, however, no additional simulation models of EoATs and/or items are to be validated, the process 1000 may end, as at 1022.

Using the example testing rigs described herein, various mass and/or material properties of a plurality of different items may be safely, efficiently, and reliably simulated or replicated. In addition, a plurality of different end effectors may be selected and used to test, measure, and/or record physical grasp characteristics of various combinations of end effectors and items. Furthermore, simulation models of items and end effectors may be generated or developed, and simulation programs or applications may execute simulated grasping of the simulation models of items by the simulation models of end effectors to determine simulated grasp characteristics. Such simulation models may be validated by processing and comparing simulated grasp characteristics with physical grasp characteristics, and modifying, tuning, correcting, or aligning the simulation models with the real-world, physical items and end effectors based on differences between the simulated and physical grasp characteristics. In this manner, capabilities of end effectors and associated robotic arms or movement systems may be safely, efficiently, and reliably tested, measured, and/or recorded to facilitate various material handling operations or processes, and simulation models of end effectors and items may be validated to enable safe, efficient, and reliable design, testing, and simulation of various material handling operations or processes.

Figure 11:
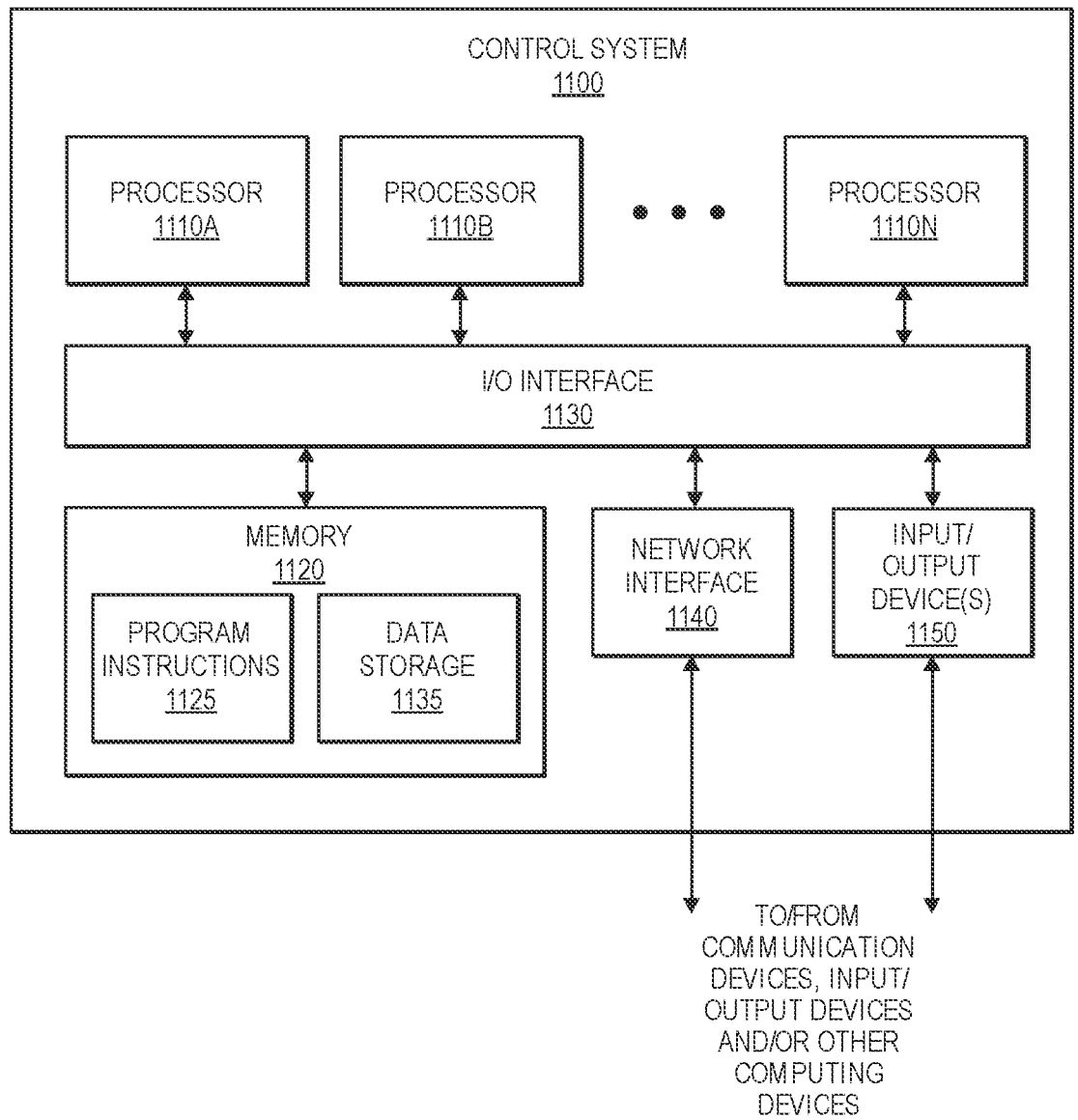
FIG. 11 is a block diagram illustrating various components of an example control system, in accordance with implementations of the present disclosure.

FIG. 11 is a block diagram illustrating various components of an example control system 1100, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 11. In the illustrated implementation, a control system 1100 includes one or more processors 1110A, 1110B through 1110N, coupled to a non-transitory computer-readable storage medium 1120 via an input/output (I/O) interface 1130. The control system 1100 further includes a network interface 1140 coupled to the I/O interface 1130, and one or more input/output devices 1150. In some implementations, it is contemplated that a described implementation may be implemented using a single instance of the control system 1100 while, in other implementations, multiple such systems or multiple nodes making up the control system 1100 may be configured to host different portions or instances of the described implementations. For example, in one implementation, some data sources or services (e.g., related to portions of end effector testing or simulation model validation systems, operations, or processes, etc.) may be implemented via one or more nodes of the control system 1100 that are distinct from those nodes implementing other data sources or services (e.g., related to other portions of end effector testing or simulation model validation systems, operations, or processes, etc.).

In various implementations, the control system 1100 may be a uniprocessor system including one processor 1110A, or a multiprocessor system including several processors 1110A-1110N (e.g., two, four, eight, or another suitable number). The processors 1110A-1110N may be any suitable processor capable of executing instructions. For example, in various implementations, the processors 1110A-1110N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1110A-1110N may commonly, but not necessarily, implement the same ISA.

The non-transitory computer-readable storage medium 1120 may be configured to store executable instructions and/or data accessible by the one or more processors 1110A-1110N. In various implementations, the non-transitory computer-readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1120 as program instructions 1125 and data storage 1135, respectively. In other implementations, program instructions and/or data may be received, sent or stored upon different types of computer-accessible media, such as non-transitory media, or on similar media separate from the non-transitory computer-readable storage medium 1120 or the control system 1100. Generally speaking, a non-transitory, computer-readable storage medium may include storage media or memory media such as magnetic or optical media, e.g., disk or CD/DVD-ROM, coupled to the control system 1100 via the I/O interface 1130. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1140.

In one implementation, the I/O interface 1130 may be configured to coordinate I/O traffic between the processors 1110A-1110N, the non-transitory computer-readable storage medium 1120, and any peripheral devices, including the network interface 1140 or other peripheral interfaces, such as input/output devices 1150. In some implementations, the I/O interface 1130 may perform any necessary protocol, timing or other data transformations to convert data signals from one component (e.g., non-transitory computer-readable storage medium 1120) into a format suitable for use by another component (e.g., processors 1110A-1110N). In some implementations, the I/O interface 1130 may include support for devices attached through various types of peripheral buses, such as a variant of the Peripheral Component Interconnect (PCI) bus standard or the Universal Serial Bus (USB) standard, for example. In some implementations, the function of the I/O interface 1130 may be split into two or more separate components, such as a north bridge and a south bridge, for example. Also, in some implementations, some or all of the functionality of the I/O interface 1130, such as an interface to the non-transitory computer-readable storage medium 1120, may be incorporated directly into the processors 1110A-1110N.

The network interface 1140 may be configured to allow data to be exchanged between the control system 1100 and other devices attached to a network, such as other control systems, material handling system controllers, warehouse management systems, other computer systems, robotic arms, other movement machines or systems, various types of actuators, various types of sensors, various types of vision systems, imaging devices, or imaging sensors, other material handling systems or equipment, or between nodes of the control system 1100. In various implementations, the network interface 1140 may support communication via wired or wireless general data networks, such as any suitable type of Ethernet network.

Input/output devices 1150 may, in some implementations, include one or more visual input/output devices, displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1100. Multiple input/output devices 1150 may be present in the control system 1100 or may be distributed on various nodes of the control system 1100. In some implementations, similar input/output devices may be separate from the control system 1100 and may interact with one or more nodes of the control system 1100 through a wired or wireless connection, such as over the network interface 1140.

As shown in FIG. 11, the memory 1120 may include program instructions 1125 that may be configured to implement one or more of the described implementations and/or provide data storage 1135, which may comprise various tables, data stores and/or other data structures accessible by the program instructions 1125. The program instructions 1125 may include various executable instructions, programs, or applications to facilitate end effector testing and/or simulation model validation operations and processes described herein, such as robotic arm or movement system, machine, or apparatus controllers, drivers, or applications, end effector controllers, drivers, or applications, testing rig controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, simulation program controllers, drivers, or applications, simulation model controllers, drivers, or applications, data processing controllers, drivers, or applications, etc. The data storage 1135 may include various data stores for maintaining data related to systems, operations, or processes described herein, such as robotic arms or movement systems, machines, or apparatus, end effectors, testing rigs, items or objects, material properties, mass properties, actuators, sensors, sensor data, vision systems or imaging devices, imaging data, physical grasp characteristics, simulation models, simulated grasp characteristics, material handling equipment or apparatus, etc.

Those skilled in the art will appreciate that the control system 1100 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 9 and 10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system to test an end of arm tool (EoAT), comprising:
    a testing rig, comprising:
        a base plate;
        at least one linear slide coupled to the base plate; and
        a weight assembly coupled to the at least one linear slide, the weight assembly configured to move relative to the base plate via the at least one linear slide; and
    a control system configured to at least:
        determine an EoAT to grasp the testing rig;
        determine mass properties for the testing rig;
        instruct movement of the weight assembly of the testing rig based at least in part on the determined mass properties; and
        instruct the EoAT to grasp the testing rig having the determined mass properties.

2. The system of claim 1, wherein the control system is further configured to:
    measure grasp characteristics of the EoAT; and
    record the grasp characteristics of the EoAT.

3. The system of claim 1, wherein the EoAT is configured to grasp the testing rig via the base plate using suction.

4. The system of claim 1, wherein the base plate further comprises a cover that is formed from at least one of cardboard or plastic.

5. An apparatus, comprising:
a base plate configured to be grasped by an end effector; and
a variable weight assembly movably coupled to the base plate;
wherein the variable weight assembly is configured to be moved relative to the base plate to modify mass properties associated with the apparatus.

6. The apparatus of claim 5, wherein the base plate further comprises:
a base frame that extends around a periphery of the base plate; and
a cover coupled to the base frame and configured to be grasped by the end effector using suction.

7. The apparatus of claim 5, wherein the variable weight assembly is movably coupled to the base plate via a movement assembly;
wherein the movement assembly comprises at least one of a linear slide, a lead screw, a guide track, or a rotary joint.

8. The apparatus of claim 7, wherein the movement assembly comprises the linear slide; and
the movement assembly further comprises:
a position guide associated with a first static portion of the linear slide; and
a position indicator associated with a second movable portion of the linear slide.

9. The apparatus of claim 8, wherein the movement assembly further comprises:
at least one brake associated with the second movable portion of the linear slide, the at least one brake configured to lock a position of the second movable portion relative to the first static portion of the linear slide.

10. The apparatus of claim 8, wherein the movement assembly further comprises:
at least one stop associated with the first static portion of the linear slide, the at least one stop configured to limit a movement of the second movable portion relative to the first static portion of the linear slide.

11. The apparatus of claim 7, wherein the movement assembly comprises the linear slide and the lead screw; and
wherein the lead screw is configured to cause movement of a second movable portion of the linear slide relative to a first static portion of the linear slide.

12. The apparatus of claim 7, wherein the movement assembly further comprises:
an actuator configured to cause movement of the movement assembly; and
a sensor configured to detect at least one of a position, orientation, speed, acceleration, force, or moment associated with the movement assembly.

13. The apparatus of claim 7, wherein the movement assembly further comprises:
a first linear slide and a second linear slide coupled to the base plate and arranged substantially parallel with each other, the first and second linear slides configured to allow movement of the variable weight assembly along a first direction; and
a third linear slide coupled to the first and second linear slides and arranged substantially orthogonally to the first and second linear slides, the third linear slide configured to allow movement of the variable weight assembly along a second direction substantially orthogonal to the first direction.

14. The apparatus of claim 13, wherein the movement assembly further comprises:
a first lead screw that extends substantially parallel with the third linear slide, the first lead screw configured to cause movement of the variable weight assembly along the second direction substantially orthogonal to the first direction; and
a second lead screw that extends substantially parallel with the first and second linear slides, the second lead screw configured to cause movement of the variable weight assembly along the first direction.

15. The apparatus of claim 5, wherein the variable weight assembly further comprises:
a weight arm movably coupled to the base plate;
a weight shaft removably coupled to the weight arm;
at least one weight removably coupled to the weight shaft; and
at least one clamp removably coupled to the weight shaft.

16. The apparatus of claim 5, wherein the mass properties associated with the apparatus comprise at least one of a weight, a moment, a weight distribution, or a center of gravity.

17. A method to test an end effector, comprising:
determining, by a control system, an end effector to grasp a testing rig;
determining, by the control system, mass properties for the testing rig;
instructing, by the control system, movement of a variable weight assembly of the testing rig based at least in part on the determined mass properties; and
instructing, by the control system, the end effector to grasp the testing rig having the determined mass properties.

18. The method of claim 17, further comprising:
generating, by the control system, a simulation model of the end effector;
generating, by the control system, a simulation model of an item having the determined mass properties; and
simulating, by the control system, grasping of the simulation model of the item by the simulation model of the end effector.

19. The method of claim 18, further comprising:
measuring, by the control system, physical grasp characteristics of the end effector and the testing rig; and
measuring, by the control system, simulated grasp characteristics of the simulation model of the end effector and the simulation model of the item.

20. The method of claim 19, further comprising:
determining, by the control system, differences between the physical grasp characteristics and the simulated grasp characteristics; and
adjusting, by the control system, at least one of the simulation model of the end effector or the simulation model of the item based on the determined differences.

* * * * *